US009300168B2

(12) United States Patent
Elleman et al.

(10) Patent No.: US 9,300,168 B2
(45) Date of Patent: Mar. 29, 2016

(54) HYBRID POWER SYSTEM FOR A VEHICLE

(75) Inventors: Dean S. Elleman, Palatine, IL (US); Gordon Helm, St. Joseph, MI (US)

(73) Assignee: Derek S. Elleman, Chicago, IL (US)

( * ) Notice: Subject to any disclaimer, the term of this patent is extended or adjusted under 35 U.S.C. 154(b) by 0 days.

(21) Appl. No.: 12/273,190

(22) Filed: Nov. 18, 2008

(65) Prior Publication Data
US 2010/0123352 A1 May 20, 2010

(51) Int. Cl.
*H02J 7/00* (2006.01)
*H02J 7/34* (2006.01)
*H02J 15/00* (2006.01)

(52) U.S. Cl.
CPC .............. *H02J 7/345* (2013.01); *H02J 7/0063* (2013.01); *H02J 15/006* (2013.01); *Y02E 60/15* (2013.01); *Y10T 307/625* (2015.04)

(58) Field of Classification Search
USPC ......................................................... 320/132
See application file for complete search history.

(56) References Cited

U.S. PATENT DOCUMENTS

| 3,704,760 | A | | 12/1972 | Maruyama | |
|---|---|---|---|---|---|
| 4,348,628 | A | * | 9/1982 | Loucks | 320/124 |
| 5,296,799 | A | | 3/1994 | Davis | |
| 5,432,383 | A | | 7/1995 | Kawamura | |
| 5,489,765 | A | | 2/1996 | Fezza | |
| 5,606,233 | A | * | 2/1997 | Davis | 318/142 |
| 5,823,281 | A | | 10/1998 | Yamaguchi et al. | |
| 6,140,799 | A | | 10/2000 | Thomasson | |
| 6,236,185 | B1 | | 5/2001 | Hines | |
| 6,317,697 | B1 | * | 11/2001 | Yoshikawa et al. | 320/149 |
| 6,367,247 | B1 | | 4/2002 | Yancey | |
| 6,834,737 | B2 | | 12/2004 | Bloxham | |
| 7,078,877 | B2 | * | 7/2006 | Salasoo et al. | 320/104 |
| 7,157,802 | B2 | | 1/2007 | Bodkin | |
| 7,252,165 | B1 | | 8/2007 | Gruenwald et al. | |
| 7,315,089 | B2 | | 1/2008 | Lambertson | |
| 2003/0209374 | A1 | | 11/2003 | Gallo | |
| 2004/0148934 | A1 | | 8/2004 | Pinkerton | |
| 2005/0228553 | A1 | * | 10/2005 | Tryon | 701/22 |
| 2005/0269991 | A1 | * | 12/2005 | Mitsui et al. | 320/132 |
| 2005/0275374 | A1 | | 12/2005 | Guang | |
| 2006/0127704 | A1 | * | 6/2006 | Raiser | 320/101 |
| 2006/0152189 | A1 | | 7/2006 | Ambrosio | |
| 2007/0032926 | A1 | | 2/2007 | Kozarekar | |

(Continued)

FOREIGN PATENT DOCUMENTS

CN 1178742 9/1997
DE 102006021057 11/2008

(Continued)

OTHER PUBLICATIONS

MDI Website—"The World's Cleanest Car".

*Primary Examiner* — Robert Grant

(57) ABSTRACT

A hybrid power system includes an on-board compressed air supply and a battery. One or more electric motors are coupled to the vehicle wheels. The compressed air drives an air motor that is coupled to an electric generator. The electric generator is coupled to a smart power controller which controls the delivery of compressed air to the air motor and also directs the electric power to an electric motor battery bank, an accessory battery, a capacitor bank for storing the electric energy or directly to the electric motors. In accordance with the present invention, the smart energy controller optimizes the compressed air and electric energy sources to maximize the driving range of the vehicle.

6 Claims, 22 Drawing Sheets

(56) References Cited

U.S. PATENT DOCUMENTS

| | | | |
|---|---|---|---|
| 2007/0159007 A1* | 7/2007 | King et al. | 307/71 |
| 2007/0194573 A1* | 8/2007 | Lambertson, Sr. | 290/43 |
| 2007/0262667 A1 | 11/2007 | Charbonneau | |
| 2007/0284158 A1 | 12/2007 | Choi | |
| 2008/0050624 A1 | 2/2008 | Barbier | |
| 2008/0100258 A1 | 5/2008 | Ward | |
| 2008/0164081 A1 | 7/2008 | Watanabe | |

FOREIGN PATENT DOCUMENTS

| | | |
|---|---|---|
| GB | 1362445 | 8/1972 |
| JP | 1156128 | 6/1989 |
| WO | WO2007091093 | 2/2006 |
| WO | WO2008023901 | 2/2008 |

\* cited by examiner

Driving Range Optimization

HYBRID POWER SYSTEM FOR A VEHICLE

BACKGROUND OF THE INVENTION

1. Field of the Invention

The present invention relates to a power system for a vehicle, and more particularly to a hybrid power system for a vehicle that does not rely on petroleum based fuels but instead relies on electric and non-electric energy sources forming a hybrid energy vehicle power source which includes a power management subsystem which continuously optimizes the use of the hybrid energy source to increase the driving range of the vehicle relative to known systems.

2. Description of the Prior Art

Various vehicle power systems are known in the art that rely on hybrid energy sources. For example, hybrid electric vehicles are known that include an internal combustion engine and an electric motor as part of the drive train. The internal combustion engine uses gasoline as an energy source. The electric motor relies on electricity from a battery. Known hybrid electric vehicles include power management systems alternate between the internal combustion engine and the electric motor as a function of the mechanical load on the vehicle power train. In some known systems, during relatively heavy loads on the vehicle power train, such as during acceleration, the internal combustion engine is used to handle the extra load and can also be used to charge the battery. During lighter mechanical loading conditions, such as during idling and operation at little or no acceleration, the internal combustion engine is switched off to conserve gasoline. During such time, motive power to the vehicle is provided by the electric motor. Although, such hybrid electric vehicles are effective in reducing the consumption of petroleum based fuels, due to the ever increasing cost of oil, there is a trend toward elimination of gasoline as a vehicle energy source altogether.

As such, various alternative energy sources have been developed or are in the process of being developed for use in power systems for vehicles. Various known electro-pneumatic vehicle power systems are based upon hybrid energy sources that include pneumatic and electric energy sources. Examples of such systems are disclosed in U.S. Pat. Nos. 3,704,760 and 7,315,089 as well as US Patent Application Publication No. US 2003/029,374 A1. Such electro-pneumatic vehicle power systems are also disclosed in Chinese patent publication no. CN 1178742 and British published patent application no. GB 1362445. In general, each of these systems include a mobile source of compressed air that is used to drive a pneumatic motor. The pneumatic motor, in turn, drives an electric generator that is used to drive an electric motor that forms part of the drive train and/or charge a battery. Some of the known systems also include pneumatic motors that are included in the drive train. In those systems, the vehicles are alternatively powered by either the electric motors or the pneumatic motors.

More particularly, U.S. Pat. No. 3,704,760 discloses an electro-pneumatic propelling system for vehicles. FIG. 1 illustrates a wheel W driven by the combined power of an electric motor $M_e$ and a pneumatic motor $M_p$ delivered from an output shaft 15. Compressed air is used to rotate a turbine 4 that is mechanically coupled to a generator G by way of a belt 6 and a pair of pulleys 5 and 7. The electrical energy produced by the generator G is used to charge a storage battery B by way of a voltage regulator 8 The storage battery B is used to power the electric motor $M_e$.

U.S. Pat. No. 7,315,089 B2 discloses a hybrid vehicle which includes an electro-pneumatic power system for a vehicle. FIG. 1 illustrates a compressed air supply 105 that is used to power an air motor 110. The air motor 110 is coupled to a DC generator, which, in turn, is coupled to a DC to AC inverter. The AC output from the DC to AC converter is used to power an AC air compressor. Output power from the power sources is coupled to a power transmission 135.

US Patent Application Publication No. 2003/0209374 A1 discloses an electro-pneumatic power system for a vehicle. FIGS. 1, 2 and 3 illustrates compressed air driven turbine 20 which includes an inertial flywheel 21 coupled to electric generator 22. The electric generator is used to charge a battery, which, in turn, powers an electric motor that is connected to a drive wheel.

Chinese patent CN 1178742 discloses a vehicle power train system that relies on compressed air and a battery. In this system, the compressed air is used to power an air motor, that is mechanically coupled to an electric generator. The electric generator is coupled to electric motors, which, in turn, are connected to the drive wheels. The electric generator is also connected to the battery, which is also coupled to the electric motors.

British patent no. GB 1362445 discloses an electro-pneumatic propelling system for vehicles. The system includes an electric motor $M_e$ and a pneumatic motor $M_p$, connected to the drive wheels. The pneumatic motor $M_p$ is driven by compressed air. The compressed air also drives an air motor that is mechanically coupled to a battery which, in turn, powers the electric motor.

Although, the systems discussed above disclose, electro-pneumatic power systems, none disclose a power management system for optimizing the use of alternative energy sources in order to extend the driving range of the vehicle. Thus, there is a need for a power management system for use in hybrid vehicles that that optimizes the use of alternative energy sources to extend the driving range of the vehicle.

SUMMARY OF THE INVENTION

The present invention relates to a hybrid power system for a vehicle. The hybrid power system does not rely on petroleum based fuels but instead includes an electric power source and a non-electric power source forming a hybrid power source that is managed by a power management subsystem to dynamically optimize the driving range. In one embodiment of the invention, the hybrid power source includes and a plurality of batteries and a bio-diesel engine, for example, to drive one or more electric motors, coupled to the vehicle wheels. The battery supplying power to the electric motor is alternated to optimize the driving range of the vehicle. The bio-diesel or other non-electric energy source is used to drive an electric generator which can be used to recharge the batteries or provide power to the electric motor. Compressed air may also be used as a non-electric alternative energy source. In those embodiments, compressed air is used to drive an air motor that is coupled to an electric generator. The electric generator, in turn, is used to recharge the batteries or provide power to the electric motor. In accordance with the present invention, the system optimizes the non-electric and electric energy sources to maximize the driving range of the vehicle. In both embodiments, vehicle accessories, such as lights, etc, are powered by a separate accessory battery that is recharged by the non-electric power source. The system is also configured so that the accessory battery as well as the drive batteries can be charged from one or more standard 120/240 volt AC receptacles when the vehicle is not in motion. One or more capacitor banks may also be provided for storing electric energy for use in powering the drive motor and/or recharging the batteries.

DESCRIPTION OF THE DRAWING

These and other advantages of the present invention will be readily understood with reference to the following specification and attached drawing wherein.

DETAILED DESCRIPTION

The present invention relates to a hybrid power system for a vehicle. The hybrid power system does not need to rely on petroleum based fuels which includes an electric power source and a non-electric power source which can be based on petroleum or non-petroleum based fuels forming a hybrid power source. The hybrid power source is managed by a power management subsystem to dynamically optimize the driving range of the vehicle. In one embodiment of the invention, the hybrid power source includes and a plurality of batteries and a bio-diesel engine, for example, to drive one or more electric motors, coupled to the vehicle wheels. The battery supplying power to the electric motor is alternated to optimize the driving range of the vehicle. The bio-diesel or other non-electric energy source is used to drive an electric generator which can be used to recharge the batteries or provide power to the electric motor. Compressed air may also be used as a non-electric alternative energy source. In those embodiments, compressed air is used to drive an air motor that is coupled to an electric generator. The electric generator, in turn, is used to recharge the batteries or provide power to the electric motor. In accordance with the present invention, the system optimizes the non-electric and electric energy sources to maximize the driving range of the vehicle. In both embodiments, vehicle accessories, such as lights, etc, are powered by a separate accessory battery that is recharged by the non-electric power source. The system is also configured so that the accessory battery as well as the drive batteries can be charged from one or more standard 120/240 volt AC receptacles when the vehicle is not in motion. One or more capacitor banks may also be provided for storing electric energy for use in powering the drive motor and/or recharging the batteries.

Figure 1:
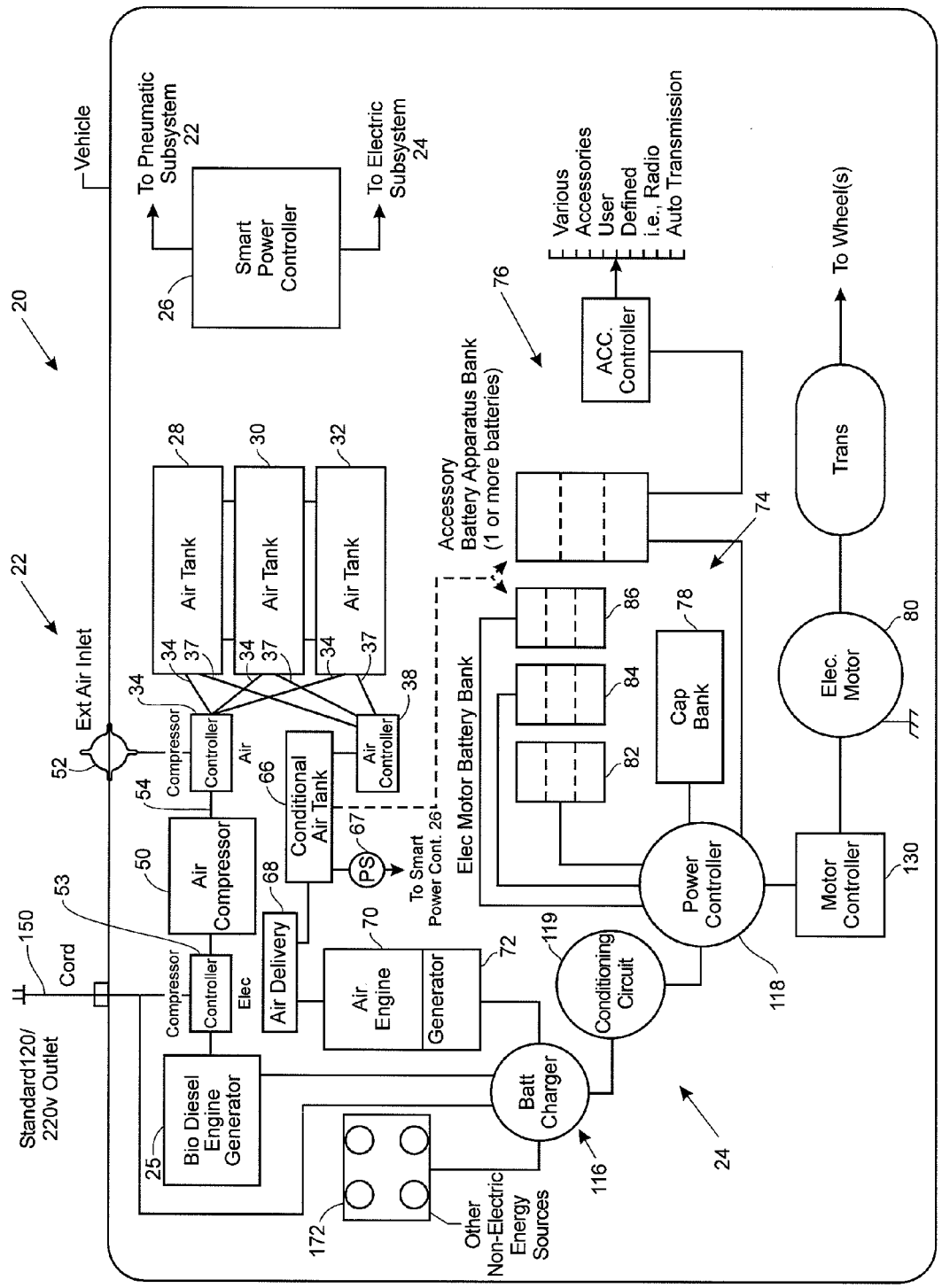
FIG. 1 is a block diagram of the hybrid power system in accordance with the present invention.

Referring to FIG. 1, the hybrid power system for the vehicle, generally identified with the reference numeral 20. The hybrid power system 20 includes an electric subsystem 24, and one or more non-electric power systems, such as a pneumatic subsystem, generally identified with the reference numeral 22 and a bio-diesel subsystem 25. The electric subsystem 24 and the non-electric subsystems 22 and/or 25 are under the control of a smart power controller 26, which controls the usage of all of the on-board energy resources.

Pneumatic Subsystem

Figure 2:
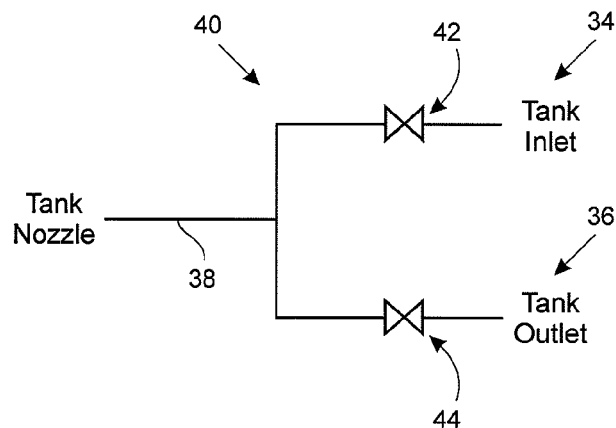
FIG. 2 is a diagram of an exemplary valving arrangement for a compressed air tank for use with the present invention.

In embodiments that include a pneumatic subsystem 22, the pneumatic subsystem 22 includes one or more compressed air tanks, for example the compressed air tanks 28, 30 and 32. Each compressed air tank, 28, 30 and 32 may be configured with inlet and outlet nozzles, 34, 37 or may be configured with a single nozzle 38 (FIG. 2) coupled to a manifold 40, which includes inlet and outlet control valves 42, 44, respectively. Each of the inlet nozzles 34 may be coupled to an inlet air controller 34, while each of the outlet nozzles 36 may be coupled to an outlet air controller 38. The inlet air controller 34 controls the filling of the air tanks 28, 30 and 32 from different sources. In particular, in embodiments which include an optional on-board air compressor 50, the inlet air controller 34 can be used to control the supply of compressed air to fill the compressed air tanks 28, 30 and 32 from either an external air inlet 52 or from the air compressor 50. The air compressor 50 can be powered by external 120/220 volt AC electric power outlet.

A plurality of pressure switches 56, 58 and 60 (FIG. 3) may be provided on the compressed air tanks 28, 30 and 32, respectively. These pressure switches 56, 58 and 60 are used to provide an indication of the amount of compressed air in the compressed air tanks 28, 30 and 32. An electrical output signal from the pressure switches 56, 58 and 60 may be provided to the smart power controller 26, which, in turn, terminates filling of the compressed air tanks 28, 30 and 32 when the tanks are full, i.e. reach a desired pressure and turns off the air compressor 50. In particular, the intake valves 42 on each of the compressed air tanks 28, 30 and 32 may be provided as electric valves, such as solenoid valves. As such, under the control of the smart power controller 26, the inlet valves 42 may be opened, one at time and filled with compressed air from either the external air inlet 52 or the air compressor 50. The valves 46 and 48 connected to the external air inlet 52 or the air compressor 50 can be either manual valves or electrically operated valves under the control of smart power controller 26. In the case of electrically operated valves 46 and 48, these valves can be controlled by a selector switch (not shown) and an on-off switch (not shown).

Figure 4:
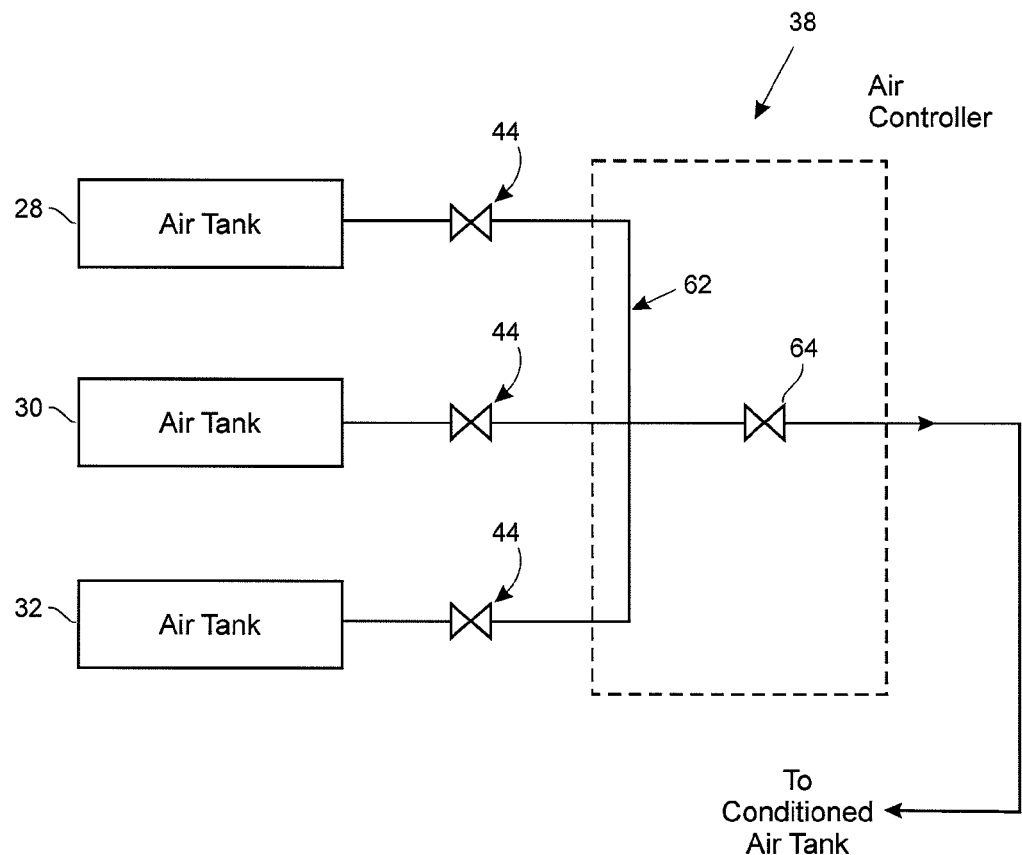
FIG. 4 is an exemplary configuration for a outlet air controller for use with the present invention.

The outlet nozzles 36 (FIG. 2) of the compressed air tanks 28, 30 and 32 may be connected to the outlet air controller 38, as discussed above. As shown in FIG. 4, the outlet air controller 38 may include a manifold 62 and an electric valve 64 under the control of the smart power controller 26. The outlet air controller 38 is used to direct compressed air from the compressed air tanks 28, 30 and 32 to a conditioned air tank 66 which may be used as a buffer for the compressed air while the system is being powered by the electric subsystem 24. A pressure switch 67 (FIG. 1) may be used to monitor the pressure of the conditioned air tank 66. The output of the pressure switch 67 is directed to the smart power controller 26 to which controls the valve 64 (FIG. 4), which controls filling of the conditioned air tank 66 (FIG. 1).

Figure 5:
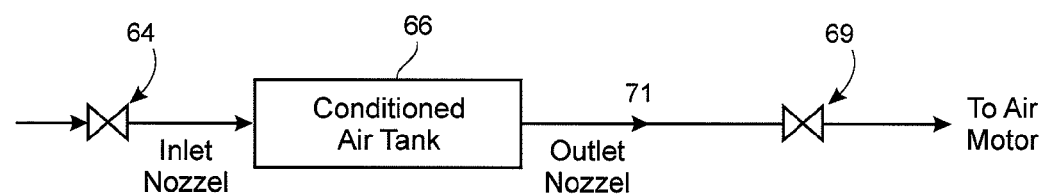
FIG. 5 is an exemplary configuration of the valving for the conditioned air tank in accordance with the present invention.

The conditioned air tank 66 includes an air delivery control system 68 which may include an electric valve 69 (FIG. 5) coupled to an outlet nozzle 71 of the conditioned air tank 66 for delivering compressed air to an air motor or engine 70 (FIG. 1). The air motor 70, in turn, is used to drive a DC electric generator 72 or alternatively an AC alternator. Alternatively, compressed air from the compressed air tanks 28, 30 and 32 can be delivered directly to the air motor 70 by way of the outlet valves 44 (FIG. 2) on the compressed air tanks 28, 30 and 32.

Electric Subsystem

The electric subsystem 24 includes the electric generator 72, a battery bank, generally identified with the reference numeral 74, an optional accessory battery 76; one or more optional capacitor banks 78 and one or more electric motors 80. The electric subsystem 24, under the control of the smart power controller 26, is configured to supply electric energy to the electric motors 80 from different sources, such as the battery bank 74; the capacitor bank 78 or directly from the electric generator 72 or other alternative non-electric power sources, such as the pneumatic subsystem 22 and the biodiesel system 25.

The charge on the capacitor bank 78 is monitored by the smart power controller 26 by sensing the voltage on the capacitor bank 78. The capacitor bank 78, under the control of the smart power controller 26, can be used to supply electric energy to the electric motors 80. Alternatively, the capacitor bank can be used to charge the battery bank 74.

The primary source of electric energy to the electric motors 80 is the battery bank 74. The battery bank 74 includes multiple batteries, for example, batteries 82, 84 and 86. Each of the batteries 82, 84 and 86 in the battery bank 74 are connected to a plurality of switches 134, 136 and 138. The switches 134, 136 and 138, which form part of the power controller 118 (FIG. 7) allows each battery 82, 84 and 86 to be connected to the battery charger 116 while the other switch in each pair allows each battery 82, 84 and 86 to be alternatively connected to the power controller 130.

The switches 90, 94, 98 as well as the switches 134, 136 and 138 allow each battery 80, 82 and 84 in the battery bank 74 to be isolated for several reasons. First, the configuration of these switches 90, 94, 98, 134, 136 and 138 enable each battery 80, 82 and 84 to be charged or alternatively used to power the drive motors 80. As such, discharged batteries are prevented from being a load on fully charged batteries and thereby discharging the charged batteries. In accordance with an important aspect of the invention, the configuration of the switches 90, 94, 98, 134, 136 and 138 allows the batteries 82, 84 and 86 to alternately supply the power to the drive motors. As such, when one of the batteries 82, 84 or 86 used to provide power to the drive motors 80 becomes discharged by a predetermined level, for example 2%-20% discharged, that battery can be disconnected from the drive motors 80 and another battery substituted to provide the power to the drive motors 80. The disconnected battery can then be recharged and made available to take over and supply power to the drive motors 80.

Figure 9:
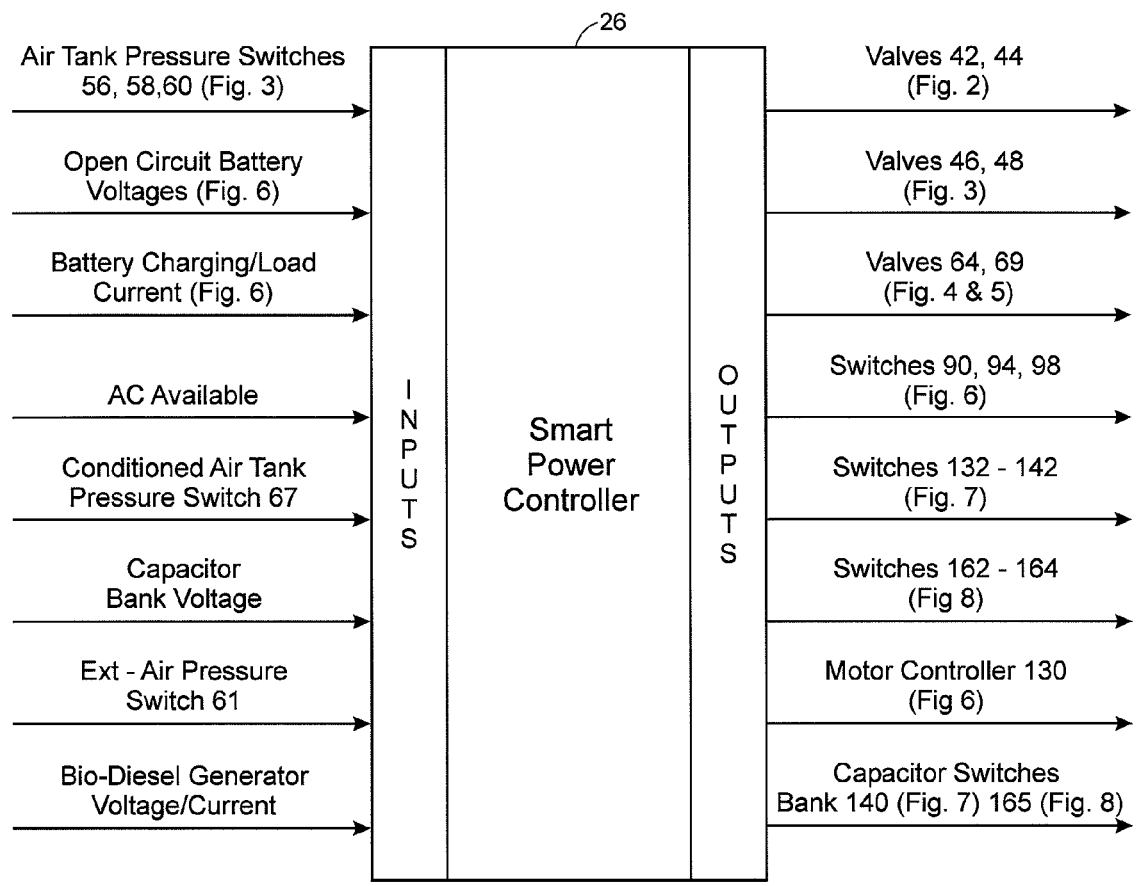
FIG. 9 is a block diagram of a smart power controller in accordance with the present invention illustrating exemplary inputs and exemplary outputs.

The switches 90, 94, 98, 134, 136 and 138 also enable each of the batteries 82, 84 and 86 to be totally isolated so that its open circuit voltage (OCV) can be measured by way of the conductors 99, 100 and 102 and reported back to the smart power controller 26. In particular, with reference to FIG. 6, each battery 82, 84 and 86 is connected to two switches 90, 94, 98, 134, 136 and 138, implemented, for example as FETs, These switches 90, 94, 98, 134, 136 and 138 enable the batteries 82, 84 and 86 to be isolated so that the OCV of the battery can be measured. For example, measurement of the OCV of the battery 82 is accomplished by opening one or both of the switches 90 and 134. The OCV is then measured by way of a conductor 99, which is conditioned by a conditioning circuit 119 (FIG. 1) which may be integrated into the battery charger 116. The conditioning circuit 119 conditions the OCV signal to be compatible with a port on a microcontroller or microprocessor that forms part of the smart power controller 26 (FIG. 9). The OCV of the other batteries 84 and 86 can be measured in a similar manner. As will be discussed in more detail below, the smart power controller 26 controls the opening and closing of the switches 90, 94, 98, 134, 136 and 138 in order to measure the OCV of the batteries 82, 84 and 86.

The battery bank 74 may also include a sense resistor 104, 106 and 108 connected in series with each of the batteries 82, 84 and 86. The voltage across the sense resistors 104, 106 and 108 is reported to the smart power controller 26 by way of conductors 109, 111 and 113, connected to ports available at the smart power controller 26. In a mode in which the battery is supplying power to the drive motors 80, the sense resistors 104, 106 and 108 provide an indication of the discharge current to enable the current battery capacity to be sensed. In particular, the voltage sense resistors 104, 106 and 108 measure the amount of electric current provided by each of the batteries 82, 84 and 86 by way of the conductors 109, 111 and 113 to determine the amount of discharge of each of the batteries 82, 84 and 86. More particularly, the discharge of a battery is a function of the product of electric current provided by the battery and the time, i.e. amp-seconds. By measuring the electric current delivered by the battery and the time, the state of charge of the battery can be determined.

In a charging mode, the sense resistors 104, 106 and 108 allow the charging current to the batteries 82, 84 and 86 to be measured. The OCV and the charging current to the batteries 82, 84 and 86 is used for controlling the charging of the batteries 82, 84 and 86. For example, lithium ion batteries require constant current as well as constant voltage charging. Charging techniques for lithium ion as well as other battery types are well known in the art. Such battery charging techniques generally depend upon the charging current and open circuit voltage for battery charging. A battery charger 116 and a power controller 118 under the control of the smart power controller 26 is able to charge the batteries 82, 84 and 86 based upon OCV and charging current applied to the batteries 82, 84 and 86 and then isolate the batteries 82, 84 and 86 once they are charged.

Figure 7:
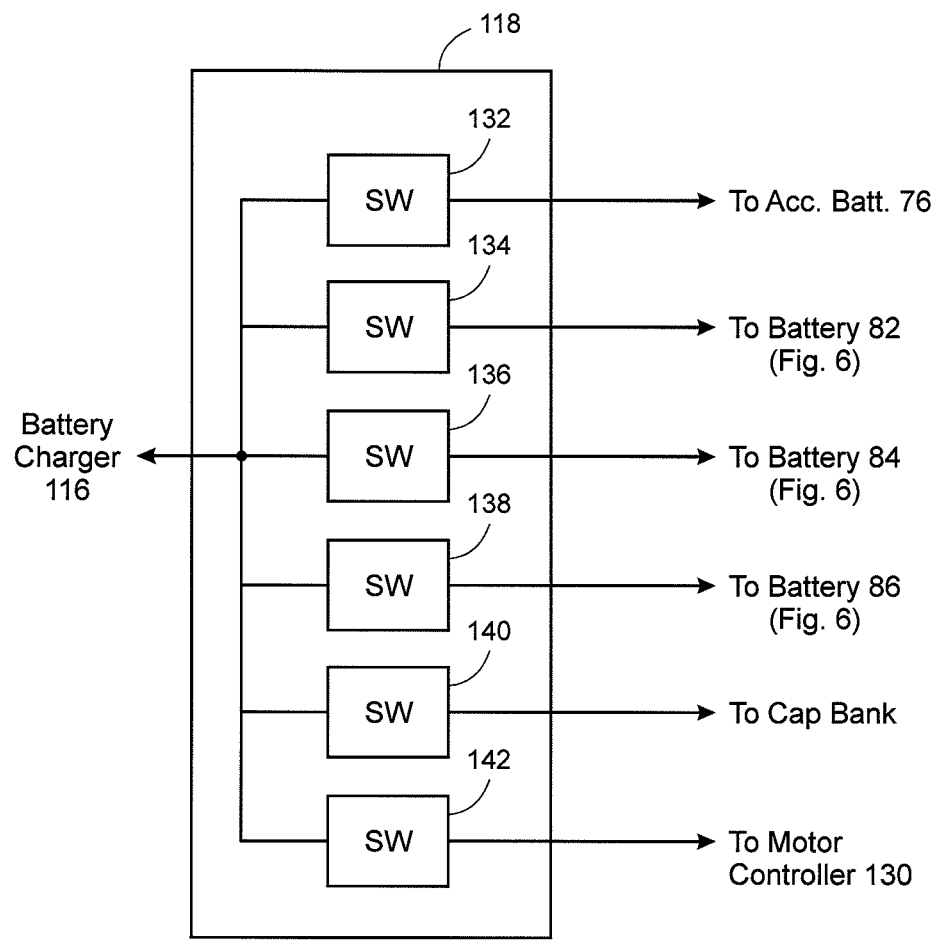
FIG. 7 is an exemplary schematic diagram for the power controller in accordance with the present invention.

As mentioned above, the switches 90, 94, 98, 134, 136 and 138 allow the batteries to be connected to the power controller 118 or alternatively to the battery charger 116. The battery charger 116 may be a conventional battery charger suitable for the type of batteries being used. The power controller 118 may simply be a set of power switches, such as the power switches 132-144 (FIG. 7). Each of these switches (132-144) is under the control of the smart power controller 26 which enables the electric generator 72, any of the batteries 82, 84 and 86 or the capacitor bank to be used to provide electric power to the electric motor(s) 80 by way of a motor controller circuit 130, which may include a contactor, which are well known in the art. The power controller 118 also allows the accessory battery 76 to be charged, as shown in FIG. 7.

Figure 8:
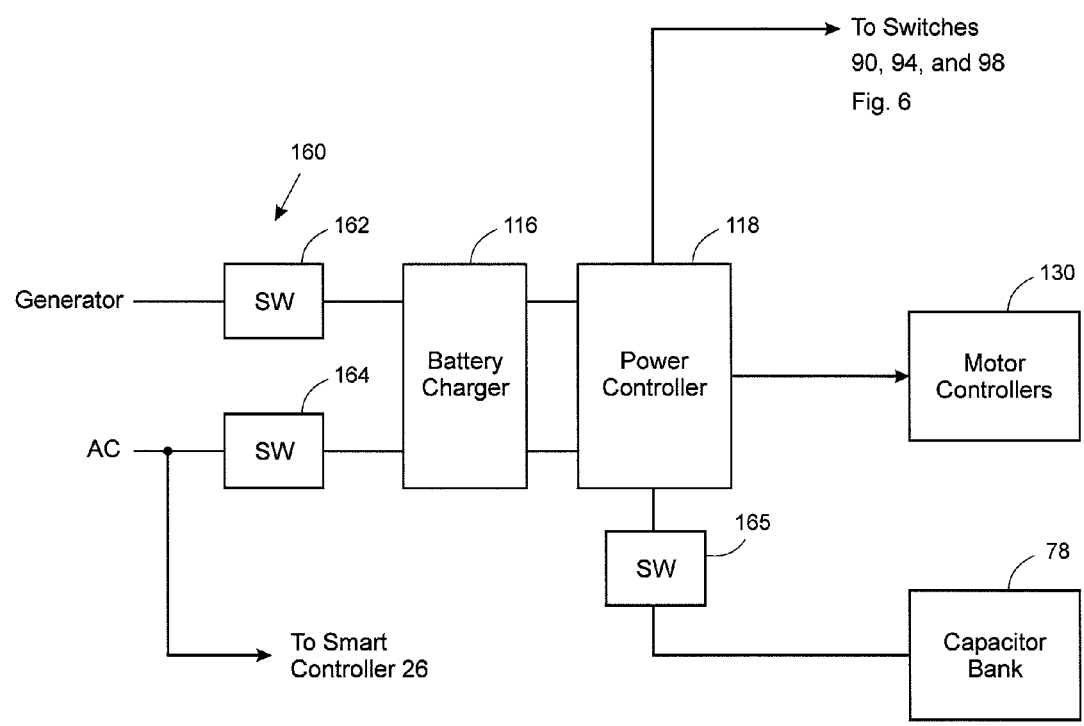
FIG. 8 is an exemplary configuration for a AC/DC controller in accordance with the present invention.

In accordance with the present invention, the battery bank 74 and the accessory battery 76 can be charged from multiple sources. In particular, the battery bank 74 and the accessory battery 76 may be charged from one or more external AC sources. In particular, one or more standard AC power cords 150 may be provided and connected to the battery charger 116, which includes an AC/DC controller 160 (FIG. 8). The AC/DC controller 160 includes a pair of switches 162 and 164 under the control of the smart power controller 26. The output voltage of the generator 72 (FIG. 1) and the AC input voltage from the AC power cords 150 are connected to the switches 162 and 164. The output voltage of the generator 72 and the AC input voltage from the power cords 150 are sensed by the smart power controller 26. The switches 162 are interlocked so that the battery charger 116 can only be connected to one or the other of the generator 72 or the AC from the 120/240 volt AC power sources at one time.

The battery bank 74 and the accessory battery 76 can also be charged from the generator 72 by way of the pneumatic subsystem 22, as described above as well as with other alternative non-electric energy sources which can provide an electrical power output, such as the bio-diesel system 25, as well as other non-electric energy sources, such as solar, wind turbine and photovoltaic sources 172.

In accordance with one aspect of the invention, the batteries 82, 84 and 86 are used primarily for providing power to the drive motors 80. A separate accessory battery 76 may be provided to provide power for various accessories, such as a radio, headlights, etc.

The system may be provided with a "fuel" gage which provides an indication of the amount of charge left in the batteries forming the battery bank 74 and the accessory battery 76. Such battery "fuel" gages are extremely well known in the art. This fuel gage data and speed data can be used to provide an indication of the estimated driving range based upon the current speed of the vehicle or an average speed of the vehicle over a predetermined time period. For example, if the vehicle is traveling at a constant or average speed of 30 miles per hour and the fuel gage indicates that the battery bank 74 has sufficient charge to power the drive motor 80 for one (1) hour, then the system would indicate a driving range of 30 miles. The system may also take into account the rate of discharge of the accessory battery 76 and adjust the driving range as a function of it. The driving range indication is a dynamic value that changes whenever the load on the batteries change and is thus updated constantly.

Bio-Diesel Subsystem

The bio-diesel subsystem 25 consists of an engine that burns bio-diesel fuels and an electric generator (not shown). Such bio-diesel engines are well known in the art. The electric energy from the electric generator connected to the bio-diesel engine may be used for various functions including: charging the battery bank 74; charging the accessory battery 76; charging the capacitor bank 78 and powering the drive motor 80. More specifically, as shown in FIG. 1, the electric generator connected to the bio-diesel engine is connected to the battery charger 116. Sensors for monitoring the voltage and electric current generated by the bio-diesel generator (not shown), are monitored by the smart power controller 26 (FIG. 9). As shown in FIG. 1, the battery charger 116, in turn, is connected to the power controller 119, by way of the conditioning circuit 119. As shown in FIG. 7, the power controller 118 allows the battery charger 116 to be connected to the accessory battery 76; the drive batteries 82, 84 and 86; the capacitor bank 78, as well as the motor controller 130, by way of the switches 132-142. The switches 132-142, in turn, are under the control of the smart power controller 26 (FIG. 9). As such, the electric energy generated by the bio-diesel engine can be used in various capacities under the control of the smart power controller 26.

Operation

In operation, the smart power controller receives inputs from the pressure switches 56, 58 and 60 in the compressed air tanks 28, 30 and 32, respectively as well as the state of charge on the batteries 82, 84 and 86 and controls the use of the compressed air in the compressed air tanks 28, 30 and 32, as a function of the state of charge in the batteries. More particularly, the batteries 82, 84 and 86 provide an alternating source of power for the drive motors 80. In order to optimize the battery usage, the system does not allow the charge of the battery 82, 84 and 86 being used to power the drive motor to drop below a predetermined value, for example, 90-95%. When the charge value drops below the predetermined value, that battery ("the discharged battery") is automatically disconnected from the drive motor 80 and another fully charged battery is connected. The discharged battery is then charged by the pneumatic subsystem 22, as discussed above. By alternating the batteries 82, 84 and 86 and only allowing them to be discharged by a predetermined amount, as discussed above, the discharged battery is disconnected from the electric motor 80 and another fully charged battery is connected in its place. The discharged battery is then discharged by the battery charger 116. The process is repeated. The process allows the discharged battery to be fully charged faster providing an extended driving range.

Another aspect of the invention is to only allow discharge of the batteries at a fairly uniform rate. As such, during constant load conditions, the drive motors 80 are driven solely by the batteries 82, 84 and 86. During changing load conditions and relatively heavy load conditions, e.g. acceleration, the capacitor bank 78 can be used to supply the additional electric current to the drive motors 80 for the additional load.

In one aspect of the invention, a bank of batteries 82, 84 and 86 is provided. Under the control of the smart power controller 26, the one battery at a time is used to provide electric power to the electric motor 80. The electric power supply to the electric motor 80 is dynamically rotated as a function of the state of charge of the battery 82, 84, 86 currently powering the electric motor 80. When the charge of that battery, drops below a predetermined level, Smart Power Controller Software Flow Charts FIGS. 10-15 are software flow diagrams for the smart power controller 26 (FIG. 9). As shown in FIG. 9, the smart power controller 26 receives a number of inputs from: the air tank pressure switches 56, 58 and 60; open circuit battery voltages; battery charging/load current; external AC availability by way of a conditioning circuit 119 (FIG. 1); the conditioned air tank pressure switch 67 and the capacitor bank voltage. The smart power controller 26, in turn, controls: the inlet and outlet valves 42 and 44 on the air tanks 28, 30 and 32; the air tank supply valves 46 and 48; the conditioned air tank valves 64 and 69; the input switches 90, 94 and 98 to the power controller 118; the power controller switches 132, 134, 136, 138, 140 and 142; the input switches 162 and 164 to the battery charger 116; the capacitor bank switch 165; and the input switch to the motor controller 130.

Figure 3:
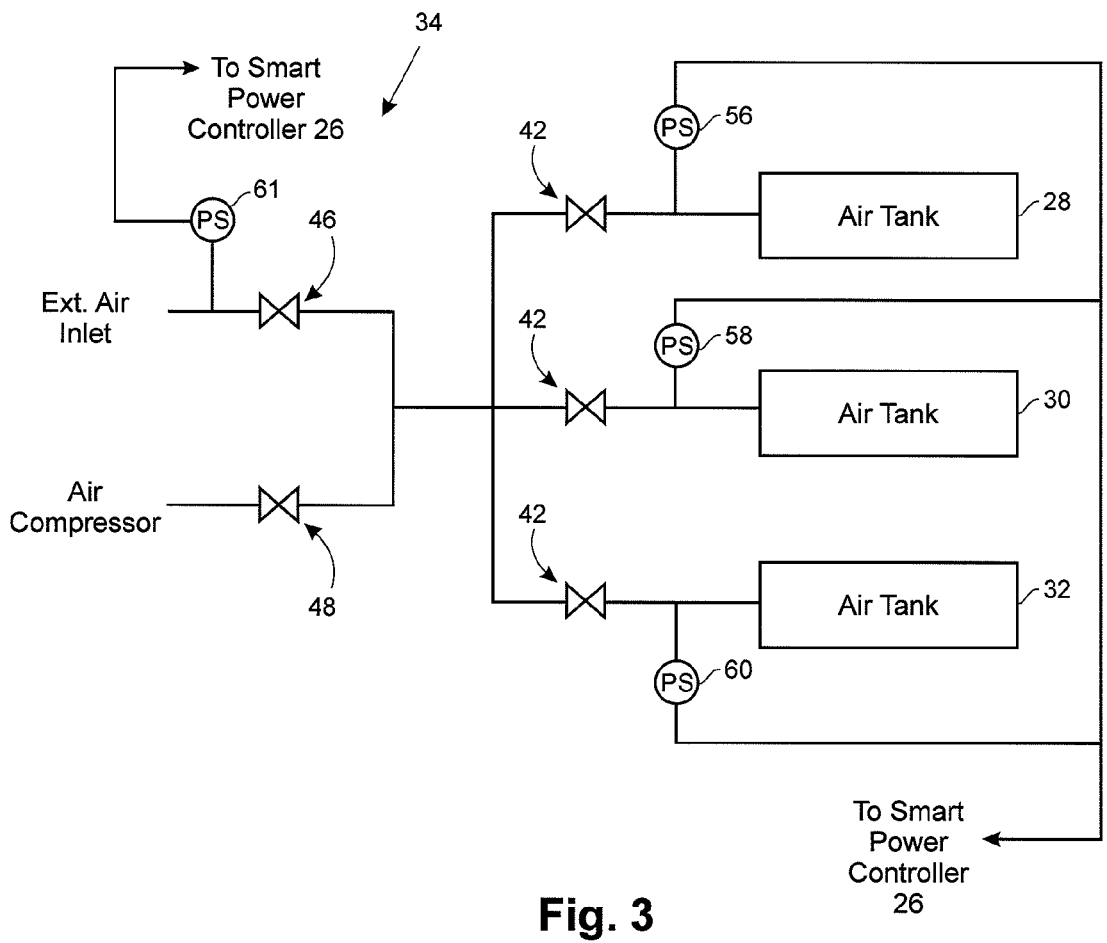
FIG. 3 is an exemplary configuration for an compressed air tank intake supply controller for use with the present invention.
Figure 10:
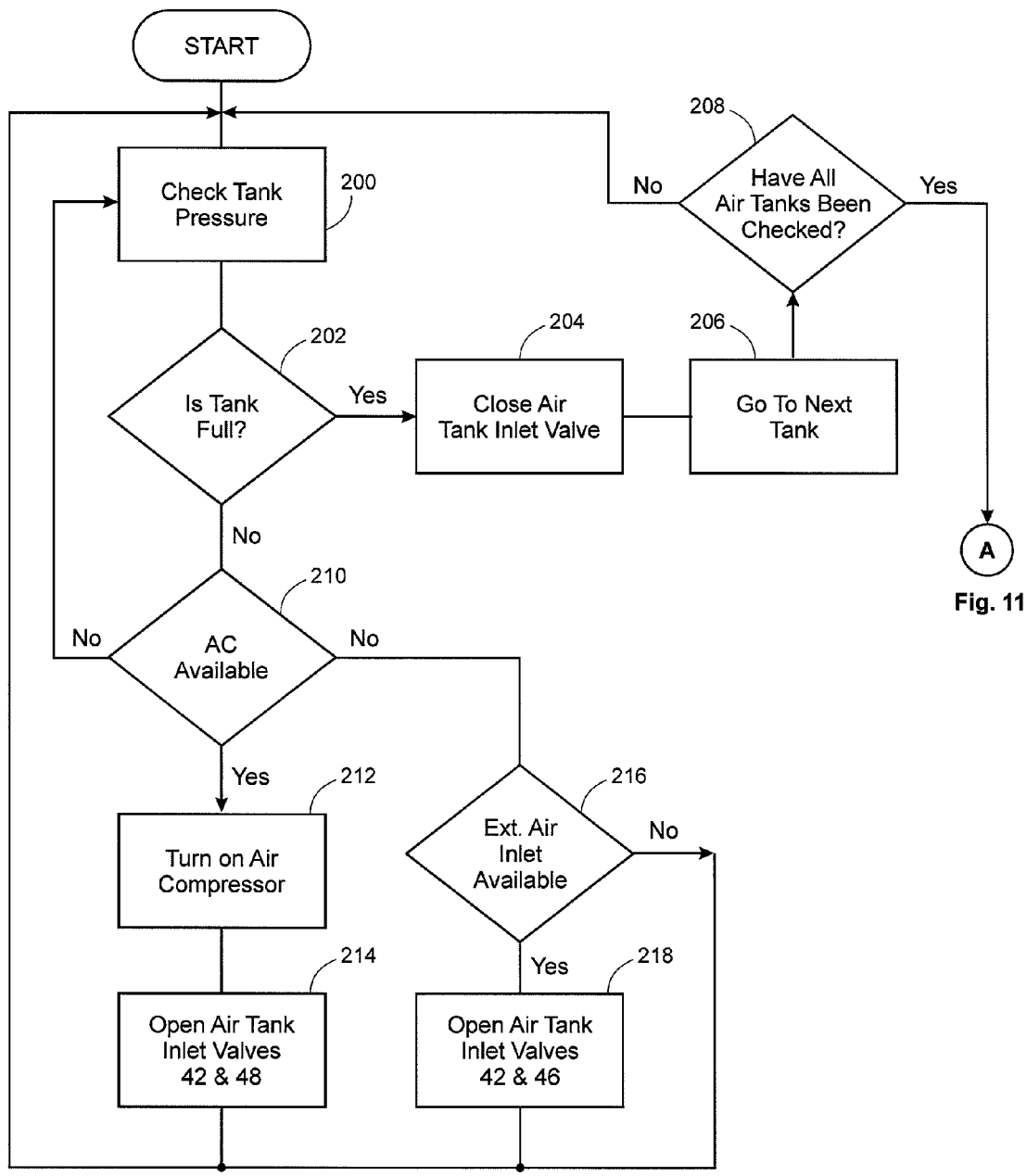
FIGS. 10-15 are exemplary flow charts for the smart power controller illustrated in FIG. 9.
Figure 11:
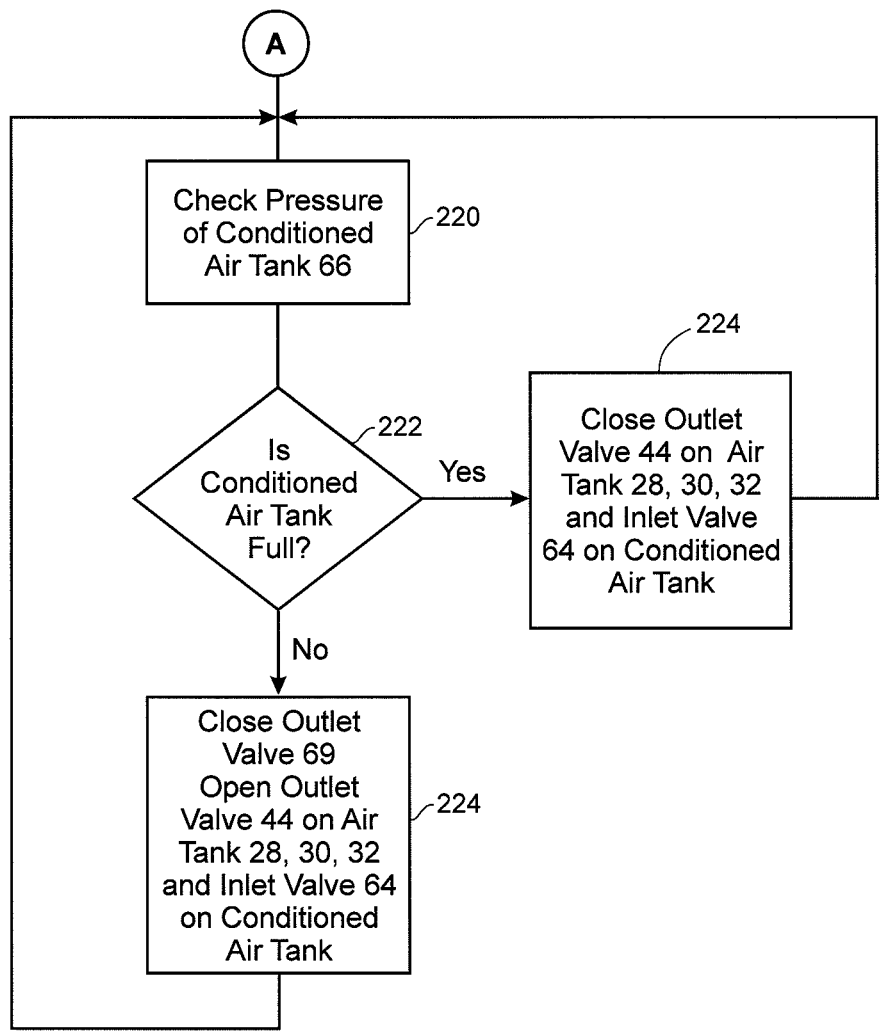
Figure 12:
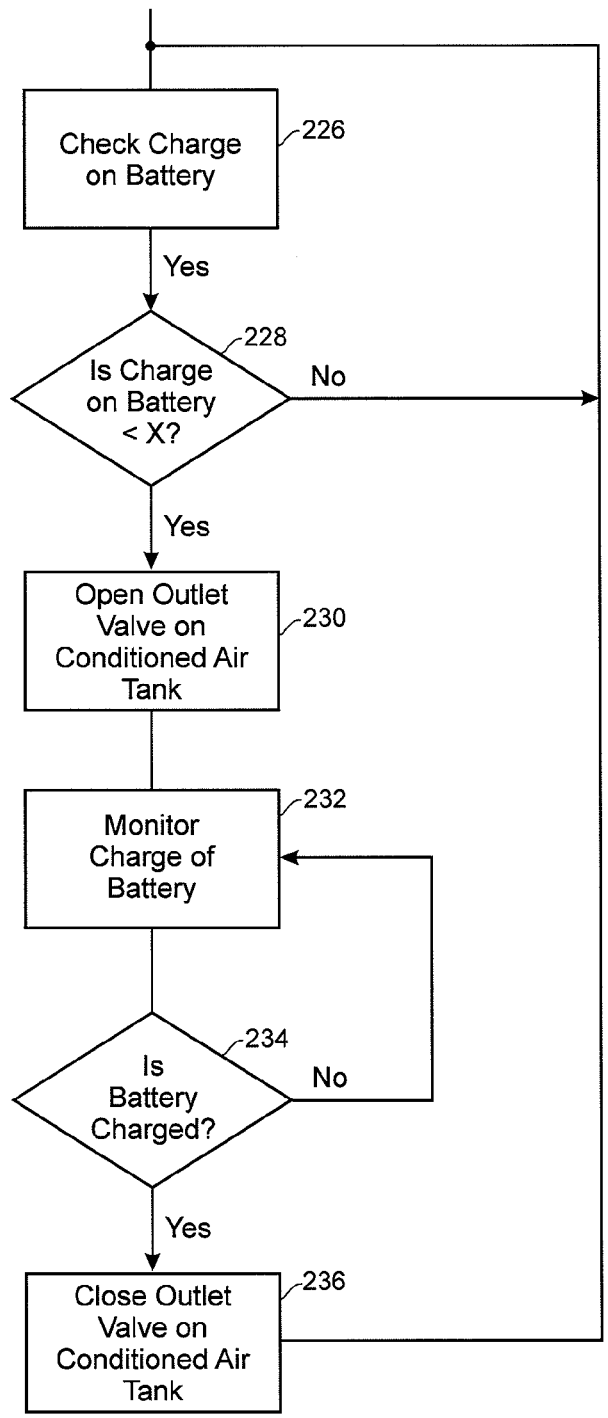
Figure 13:
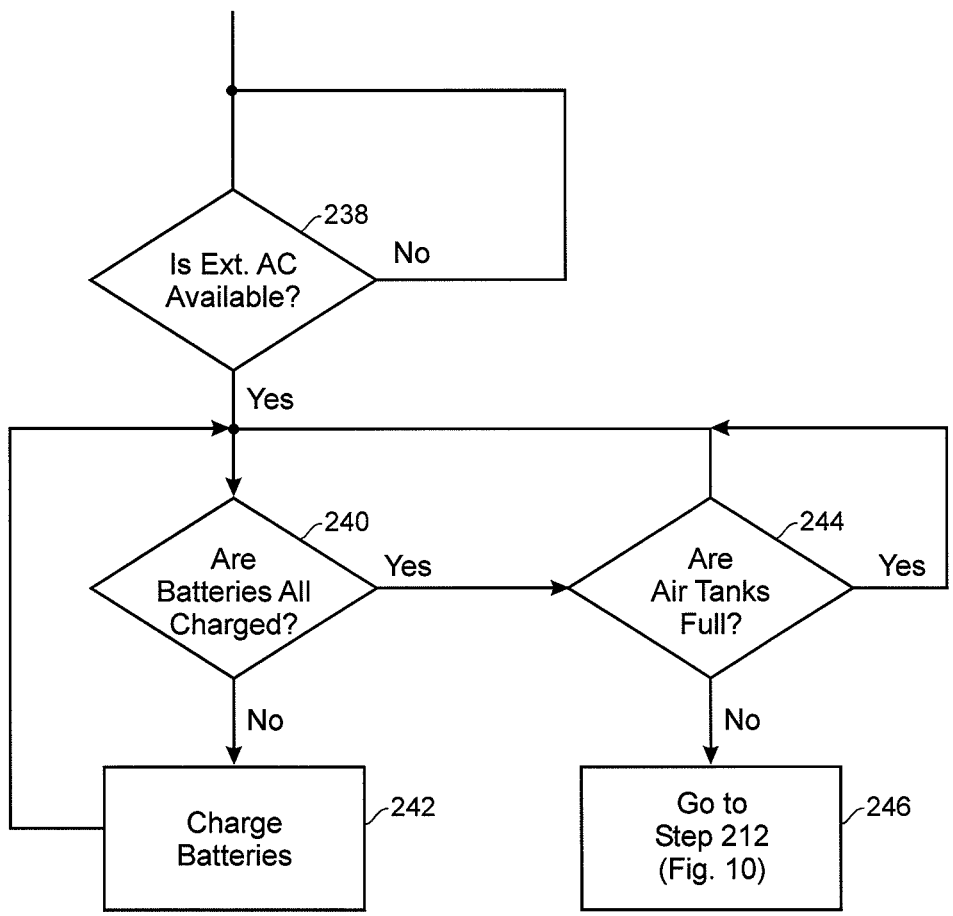
Figure 14:
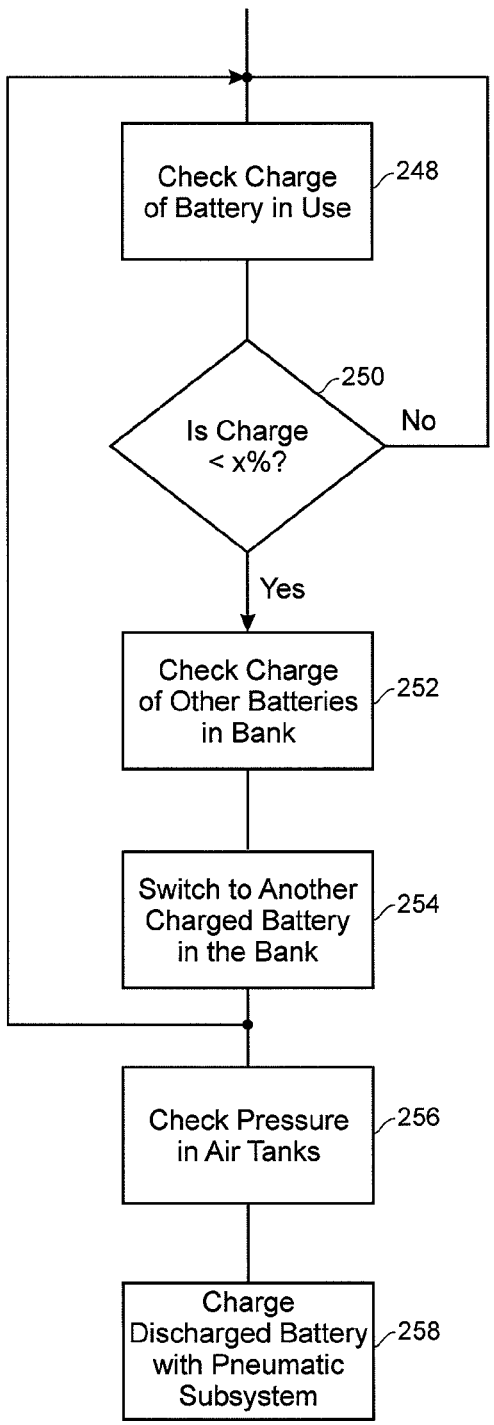
Figure 15:
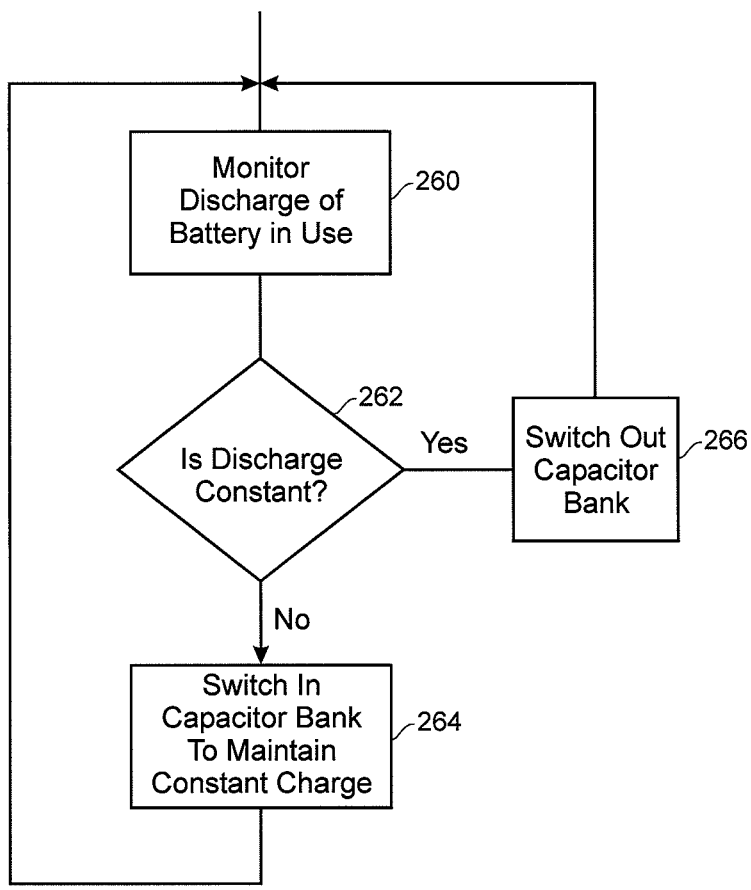

FIGS. 10-12 illustrate the control of the pneumatic subsystem 22. FIGS. 13-15 illustrate the control of the electric subsystem 24. Referring first to FIG. 10, the system periodically checks the air pressure of the air tanks 28, 30 and 32 in step 200 by way of the pressure switches 56, 58 and 60 (FIG. 3). In step 202, the system determines whether the air tanks 28, 30 and 32 are full based upon the readings of the pressure switches 56, 58 and 60. The air inlet valves 42 (FIG. 2) are closed (if not already closed) for those air tanks 28, 30 and 32 which are full in step 204. The system cycles through steps 200-208 until the current status of all of the air tanks 28, 30 and 32 has been checked. Once the air pressure of all of the air tanks 28, 30 and 32 has been checked, the system checks the air pressure of the conditioned air tank 66, as will be discussed in more detail below.

The system provides for recharging from alternative power sources. In particular, as discussed above, the system allows for the air tanks 28, 30 and 32 to be refilled from a stationary AC or pneumatic power source. Also, the system also provides for recharging of the batteries 82, 84 and 86 from a stationary AC source. More particularly, in step 210, the system checks whether external AC is available by checking the input to the smart power controller 26. If not, the system cycles back and periodically checks the air pressure in the air tanks 28, 30 and 32. If external AC power is available and one or more of the air tanks 28, 30 and 32 are not fully charged, the system automatically turns on the air compressor 50 (FIG. 1) for example, by providing a drive signal to an air compressor motor controller (not shown) in step 212. The inlet valves 42 (FIGS. 2 and 3) are opened as well as the air compressor outlet valve 48 in step 214. Once the inlet valve 42 and the air compressor outlet valve 48 have been opened, the system loops back to step 200 and checks the air pressure in the air tank 28, 30 32 of the tank being filled by way of the pressure switches 56, 58 and 60, as discussed above. Once the tank being filled is full, the valves 42 and 48 are closed in step 204. The system then moves on to the next tank in step 206 and repeats steps 200, 202, 210, 212 and 214.

In step 216, the system checks whether an external source of pneumatic air is available by checking the signal from the pressure switch 61 (FIG. 3). If an external source of pneumatic air is not available, the system loops back to step 200 and checks the air pressure of the air tanks 28, 30 and 32. If an external source of pneumatic air is available, the smart power controller opens the inlet valve 42 (FIG. 2) to the air tank 28, 30 and 32 as well as the external pneumatic air outlet valve 46 (FIG. 3) in step 218. Once the inlet valve 42 and the external pneumatic air outlet valve 46 have been opened, the system loops back to step 200 and checks the air pressure in the air tank 28, 30 32 of the tank being filled by way of the pressure switches 56, 58 and 60, as discussed above. Once the tank being filled is full, the valves 42 and 46 are closed in step 204. The system then moves on to the next tank in step 206 and repeats steps 200, 202, 210, 216 and 218.

FIG. 11 illustrates the control logic for the conditioned air tank. Initially, the system checks the pressure of the conditioned air tank 66 by way of the pressure switch 67 (FIG. 1) in step 220. If the conditioned air tank is full, as determined in step 222, the system closes the outlet valves 44 (FIG. 2) of any air tank 28, 30 32 (if not already closed) of any air tank 28, 30, 32 feeding the conditioned air tank 66 in step 224. If the conditioned air tank 66 is not fully charged, the system closes the conditioned air tank outlet valve 69 (FIG. 5), if it is not already closed and opens one of the outlet valves 44 of one of the air tanks 28, 30 and 32 as well as the inlet valve 64 (FIG. 5) to the conditioned air tank 66 in step 224. The system then loops back to step 220 and continues to monitor the air pressure in the conditioned air tank 66. When the conditioned air tank 66 is full, the system proceeds to step 224 and isolates the conditioned air tank 66, as discussed above.

FIG. 12 illustrates the control logic for the condition when the pneumatic subsystem 22 is used to charge the batteries 82, 84 and 86. Initially in step 226, the system checks the state of charge on the batteries 82, 84 and 86. This can be done by determining the amount of ampere hours expended by each of the batteries 82, 84 and 86. As such a sense resistor 104, 106 and 106 (FIG. 6) is provided for each of the batteries 82, 84 and 86. The voltage of each sense resistor 104, 106 and 108 is monitored by the smart power controller 26 by way of the conductors 109, 111 and 113 and conditioning circuitry (not shown). The voltage across each of the sense resistors 104, 106 and 108 is representative of the load current supplied by each battery 82, 84 and 86. The time (as measured by the smart power controller 26) the batteries 82, 84 and 86 provide the load current and the magnitude of the load current is representative of the state of charge of the batteries 82, 84 and 86. During a condition when one of the batteries 82, 84 and 86 is being used to provide power to the drive motors 80, one of the battery switches 134, 136 and 138 (FIG. 7) and a corresponding one of the switches 90, 94 and 98 (FIG. 6) will be closed. In step 228, the system checks which battery 82, 84 and 86 by simply checking whether there is a voltage on the load resistors 104, 106 and 108. In step 228, the system checks whether the state of charge of the battery 82, 84 and 86 is less than a predetermined value, as discussed above. If not, the system loops back to step 226 and continuously monitors the state of charge of the battery in use.

Once the state of charge of the battery in use drops below a predetermined value, another battery 82, 84 and 86 is alternatively used to provide power to the drive motors 80, as discussed above. Once the battery that was in use ("the discharged battery") is disconnected electrically from the drive motors 80, as discussed below, the pneumatic subsystem 22 is used to recharge the discharged battery. More particularly, assuming the conditioned air tank 66 (FIG. 1) is fully charged, as discussed above, the smart power controller 26 commands the outlet valve 69 (FIG. 5) to open in step 230. As discussed above, when the outlet valve 69 is open, the conditioned air tank 66 is used to drive an air engine 70 (FIG. 1) that is coupled to an electric generator 72 that is used for charging the discharged battery, as will be discussed below. While the conditioned air tank 66 is powering the air engine 70, the system monitors the charge of the battery in steps 232 and 234, as discussed below. When the discharged battery is fully charged, as discussed below, the system closes the outlet valve 69 (FIG. 5) on the conditioned air tank 66 in step 236 and then loops back to step 236.

FIG. 13 illustrates the control logic when external AC is available. Initially in step 238, the system determines if an external source of AC is available in step 238, as discussed above. In step 240, the system checks whether all of the batteries 82, 84 and 86 are charged, as discussed below. If not, the batteries 82, 84 and 86 are charged in step 242, as discussed below. The system loops back to step 240 until all of the batteries 82, 84 and 86 are charged. When all of the batteries 82, 84 and 86 are charged, the system checks the state of charge of the air tanks 28, 30 and 32 in step 244. If all of the air tanks 28, 30 and 32 are full, the system loops back to step 240. If all of the air tanks 28, 30 and 32 are not fully charged, the system returns to step 212 in FIG. 10 in step 246 and charges the discharged air tank 28, 30 and 32 by way of the air compressor 50 until all of the air tanks 28, 30 and 32 are fully charged or the external AC power supply is removed.

FIGS. 14 and 15 illustrate the control logic for optimizing the driving range of a vehicle. Referring first to FIG. 14, the system checks the state of charge of the battery in use in step 248, as discussed above. In step 250, the system checks whether the state of charge of the battery in use is less than a predetermined value, as discussed above. If the state of charge is not less than a predetermined value, the system loops back to step 248 and continues to monitor the state of charge of the battery in use. Once the system determines that the state of charge of the battery in use is less than a predetermined value, the smart power controller 26 configures the battery switches 90, 94 and 98 as well as 134, 136 and 138 (FIG. 6) to disconnect the battery in use and connect another battery to the power controller 118, which, in turn, is connected to the motor controller 130 (FIG. 1) in steps 252 and 254. After the fully charged battery is connected to the drive motors 80, the system loops back to step 248 and monitors the charge level of the new battery in use. The system also checks the air pressure of the air tanks 28, 30 and 32 in step 256 and charges the discharged battery 80, 82 and 84 in step 258.

Figure 6:
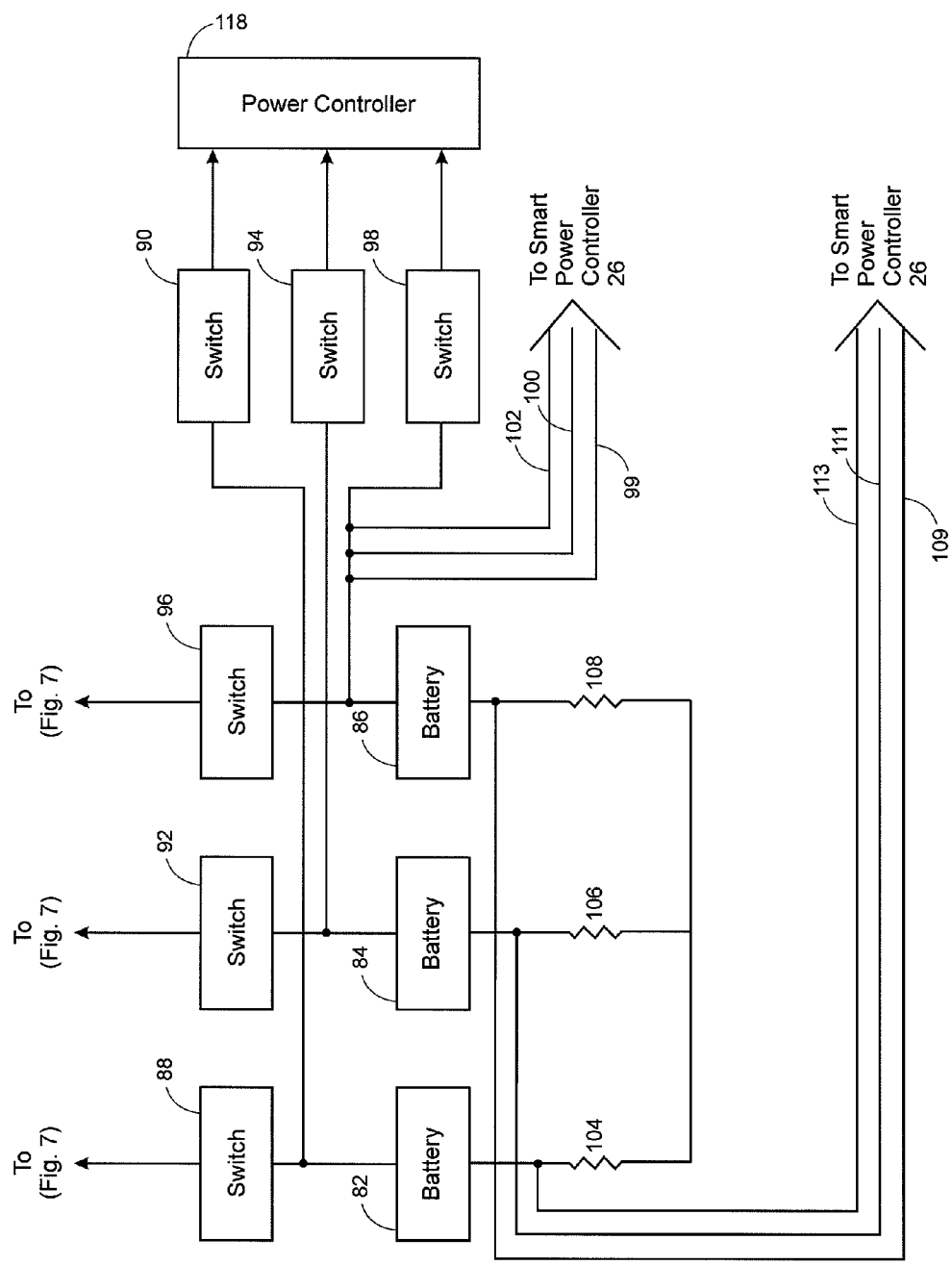
FIG. 6 is an exemplary schematic diagram for the motor battery bank for use with the present invention.

Charging of the batteries is well known in the art. As illustrated in FIGS. 6 and 7, each of the batteries is connected to the system by way of a switch 134, 136 or 138. These switches 134, 136 and 138 when opened enable the open circuit voltage of the batteries 82, 84 and 86 to be measured by way of the conductors 99, 100 and 102. The battery open circuit voltage as well as the battery charging current enables the system to determine when the battery is fully charged. For each battery being charged, the charging current is measured by way of the resistors 104, 106 and 108 and the conductors 109, 111 and 113, as discussed above, while the battery is isolated from the power controller 118. Various charge termination techniques are well known in the art which can be implemented based upon the open circuit voltage of the battery being charged and the charging current.

In one embodiment of the invention, when the fuel for all energy sources alternative to the battery, e.g compressed air, etc., the user may be given a choice to either extend the driving range of the vehicle with the batteries or stopping the vehicle and calling for service. In certain situations, such as emergency situations, the user may elect to run down the batteries to extend the driving range of the vehicle. In this mode, the batteries are connected in series and become the sole source of power to the drive motor 80. The vehicle may then be driven as far as the batteries will permit.

FIG. 15 illustrates the control logic for maintaining the discharge level of the battery in use at a constant level. In step 260, the discharge rate of the battery in use is monitored. The discharge rate is the amount of discharge, as discussed above, per unit of time. In step 262, the system determines if the discharge rate is fairly constant. If not, the system switches in the capacitor bank 78 by way of the switches 140 and 142 (FIG. 7) and returns to step 260 to monitor the load current by way of the resistors 104, 106 and 108, as discussed above. When the load current returns to a normal level and the discharge is determined to be constant, the capacitor bank 78 is switched out, as discussed above.

Adaptive Power Control Circuit

Figure 16:
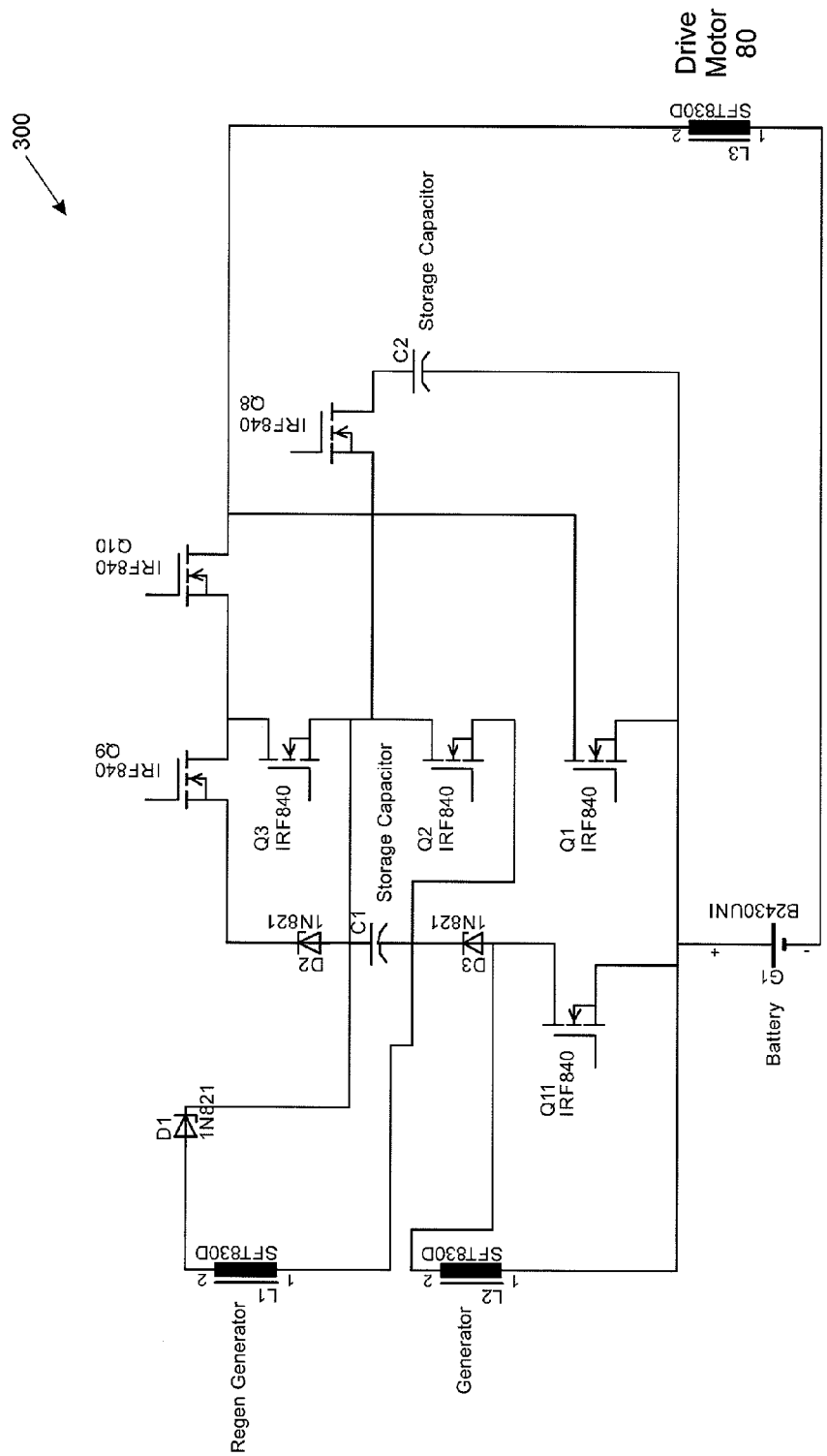
FIG. 16 is an electrical schematic diagram of an adaptive power control circuit that is responsive to the vehicle operating condition in accordance with one aspect of the invention.
Figure 17:
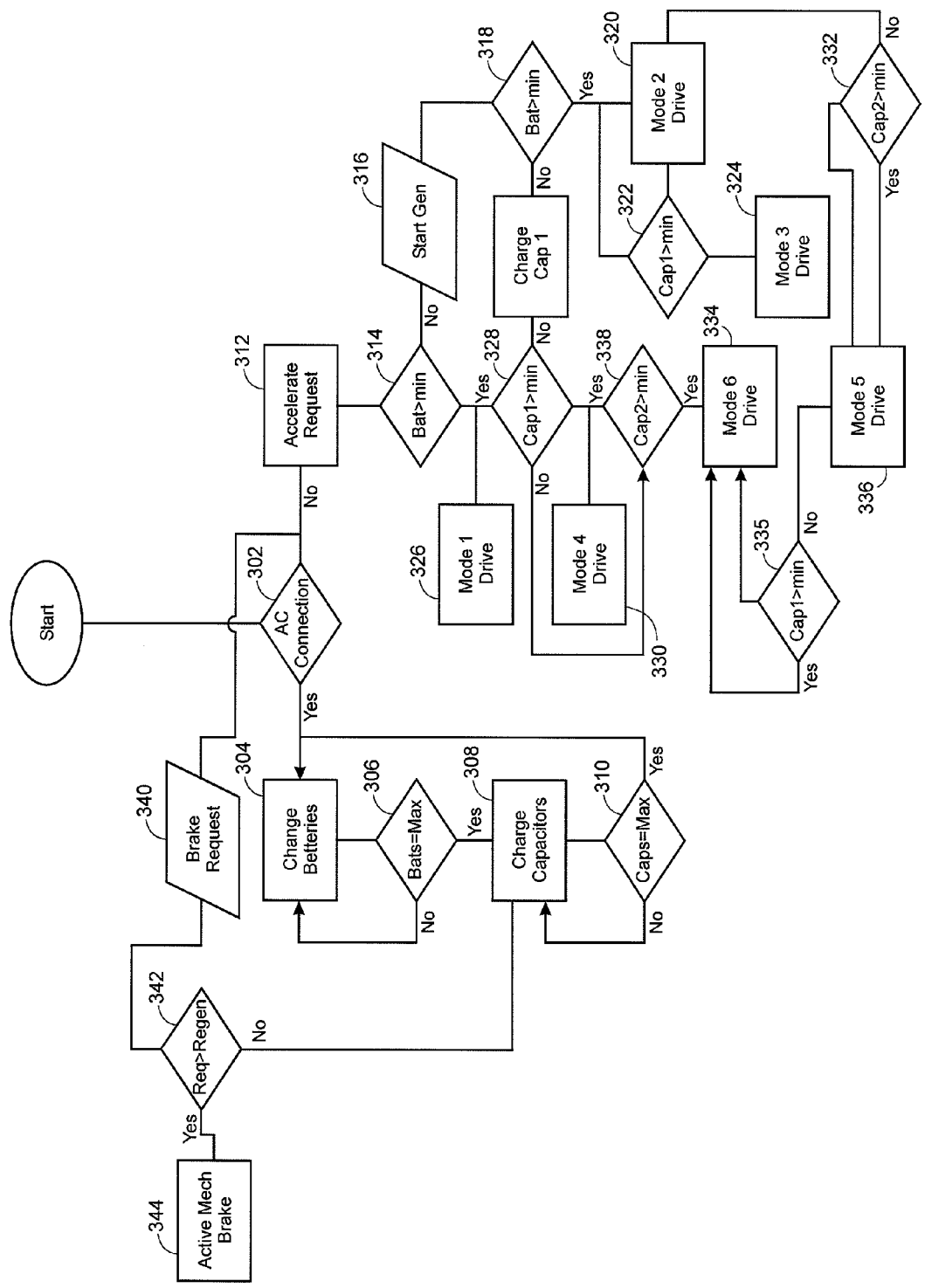
FIG. 17 is a software flow diagram for the adaptive power control circuit illustrated in FIG. 16.

FIGS. 16 and 17 illustrate an adaptive power control circuit, generally identified with the reference numeral 300. FIG. 16 illustrates an electrical schematic diagram of the adaptive power control circuit 300 while FIG. 17 illustrates a software flow diagram for the circuit illustrated in FIG. 16.

The adaptive power control circuit 300 may form a part of the smart power controller 26 (FIG. 9) and be controlled by the smart power controller 26 on a time share basis with its other functions or the adaptive power control circuit may be separately controlled from the smart power controller 26 and include its own microprocessor (not shown).

As shown, the adaptive power control circuit 300 is configured to provide a variable supply of DC voltage to a single vehicle drive motor 80 (FIG. 1) As will be discussed below, the power system 20 may be configured to deliver 48 horsepower using alternative fuels to petroleum based fuels. Additional battery banks and adaptive power control circuits can be incorporated to drive additional drive motors for increased traction, horsepower and energy generation. As will be discussed in more detail below, the additional drive motors provide additional energy during a regeneration mode when the vehicle is experiencing braking.

Referring to FIG. 16, the adaptive power control 300 includes a plurality of field effect transistors (FETS) $Q_1$, $Q_2$, $Q_3$, $Q_8$, $Q_9$, $Q_{10}$ and $Q_{11}$, a pair of storage capacitors $C_1$ and $C_2$ and a pair of diodes $D_1$ and $D_2$. As will be discussed in more detail below, the FETS $Q_1$, $Q_2$, $Q_3$, $Q_8$, $Q_9$, $Q_{10}$ and $Q_{11}$ are selectively turned on to provide additional voltage to the drive motor 80 in response to the current operating status of the vehicle. The state of the various circuit components of the adaptive power control circuit 300 during various operating modes of the vehicle are identified in the Table below. The designation "X" represents that the components are either turned on or form part of the circuit during that operating mode. There are six (6) drive modes and one (1) regeneration ("Regen") mode.

| Adaptive Power Control Circuit State Machine | | | | | | | | | | | |
|---|---|---|---|---|---|---|---|---|---|---|---|
| Mode | $Q_1$ | $Q_2$ | $Q_3$ | $Q_8$ | $Q_9$ | $Q_{10}$ | $Q_{11}$ | $C_1$ | $C_2$ | $D_1$ | $D_2$ | $D_3$ |
| 1 | X | | | | | | | | | | | |
| 2 | | X | X | | | X | | | | | | X |
| 3 | | | | X | X | | | X | | | X | X |
| 4 | | | | X | X | X | X | | | | X | X |
| 5 | | | X | X | | X | | | X | | | |
| 6 | | X | | X | X | X | | X | X | | X | |
| Regen | X | X | X | X | | X | X | X | X | X | X |

During the various operating modes, i.e. Mode 1 through Mode 6, the voltage to the drive motor 80 is increased by connecting various power sources together in series to provide increased voltage to the electric drive motor 80. In particular, the adaptive power circuit is configured so that one or more power sources are connected in parallel to the drive motor 80. Therefore, since the voltage applied to a DC motor is directly proportional to the speed and torque of the motor, increasing the voltage to the motor by serially connecting power sources enables the drive motor 80 to deliver variable speeds and torques so that the power system 20 can handle the various vehicle operating modes.

Figure 16A:
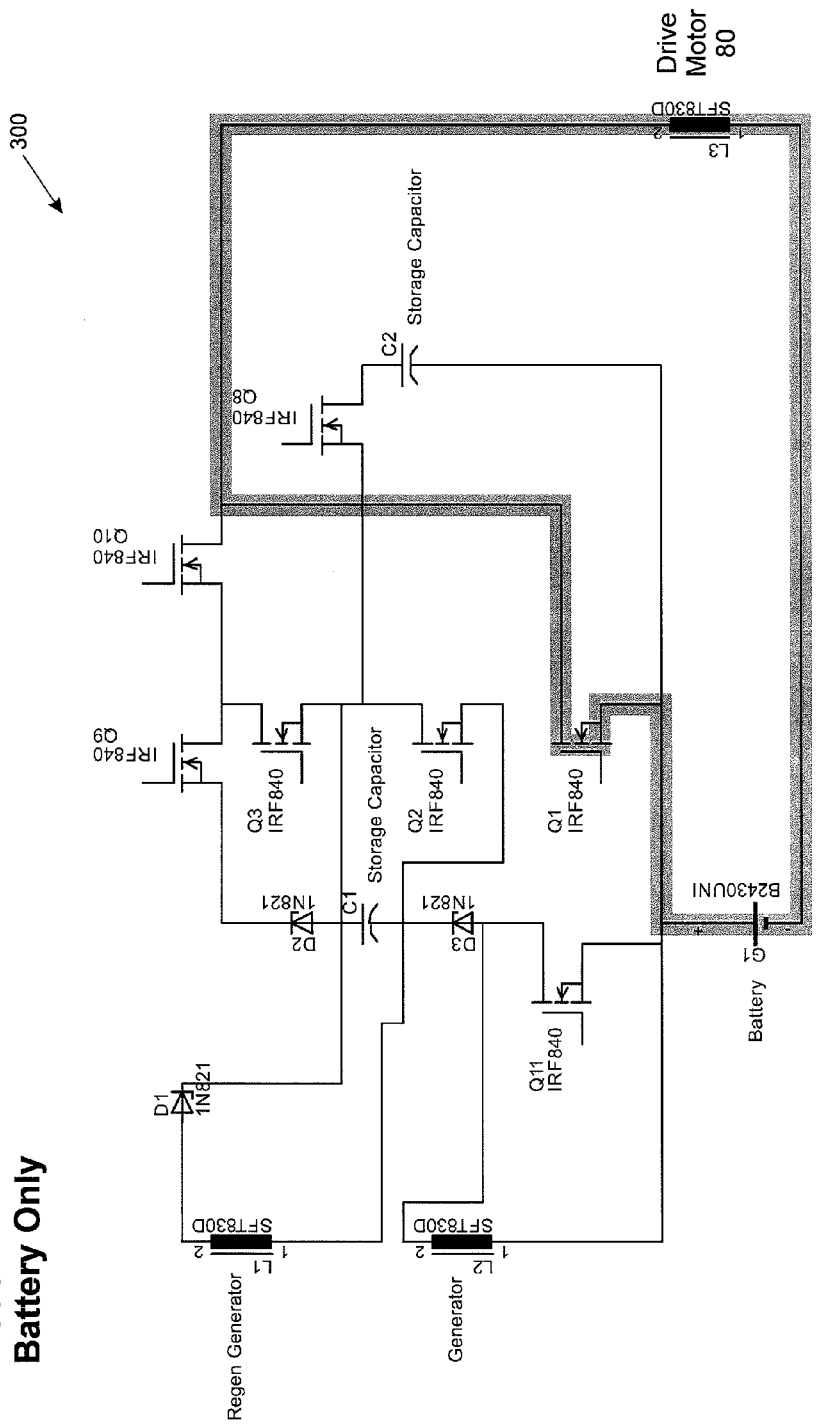
FIGS. 16A-16G are highlighted to illustrate the various operating modes of the adaptive power control circuit.

Mode 1 of the adaptive power control circuit 300 is illustrated in FIG. 16A. In Mode 1, the power to the drive motor 80 is being delivered by a single battery $G_1$, for example, Sixteen (16) Trojan Battery Company, Model 5SHP, deep cell batteries. Each battery is rated for 12 volts DC, 60 amperes and 165 ampere hours. The batters are connected in series to provide a total of 192 volts DC. Such batteries can deliver 192 volts and 60 amps continuously for almost 3 hours.

The FETs $Q_1$, $Q_2$, $Q_3$, $Q_8$, $Q_9$, $Q_{10}$ and $Q_{11}$ are rated for a maximum of 600 volts and 60 amp. Assuming that the generator 72 (FIG. 1) and the capacitor bank 78 are also able to deliver 200 volts DC, the maximum energy that can be delivered by the power system when the capacitor bank 78, the generator 72 and the batteries are connected in series, is 600 volts/60 amps. The maximum energy is thus 36,000 watts or about 48 horsepower not considering, power losses for example, due to losses in the FETS $Q_1$, $Q_2$, $Q_3$, $Q_8$, $Q_9$, $Q_{10}$ and $Q_{11}$.

In Mode 1, only $Q_1$ is in the circuit. Using a Digikey SGS-Thompson Model STY0NM60 FET, the power loss of $Q_1$ is 0.053 ohms×(60 amps)$^2$ or about 200 watts, which is relatively negligible. Mode 1 is used when the vehicle is traveling at a constant speed and is not accelerating.

Figure 16B:
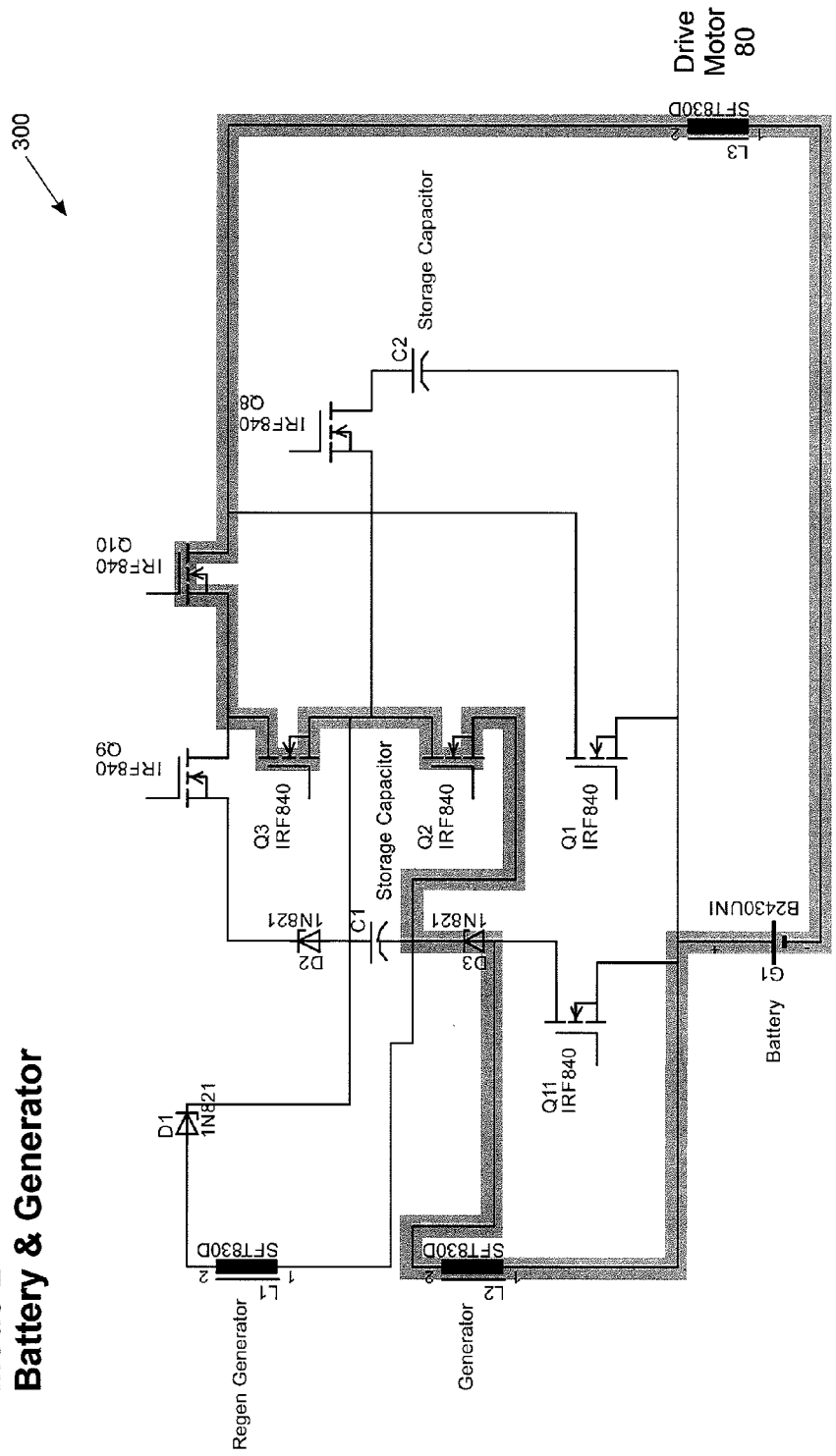

In response to an increased demand, for example, mild acceleration or mild change of vehicle grade, the adaptive power control circuit 300, transitions to Mode 2 In Mode 2, as illustrated in FIG. 16B, a DC generator, for example, the generator 72 (FIG. 1), capable of providing 200 volts DC and 16 horsepower (200 volts×60 amps/746), for example, is connected in series with the battery $G_1$, essentially doubling the power to the drive motor 80 to 32 horsepower. In this mode, the FETs $Q_1$, $Q_3$, and $Q_{10}$ are on and the diode $D_3$ is conducting. As mentioned above, the loss per FET at full power is about 200 watts. The loss for three (3) FETS can then be assumed to be 600 watts or less. The loss through the diode $D_3$ is assumed to be 60 amps×0.7 volts or 42 watts. The total losses in Mode 2 are thus about 650 watts.

Figure 16C:
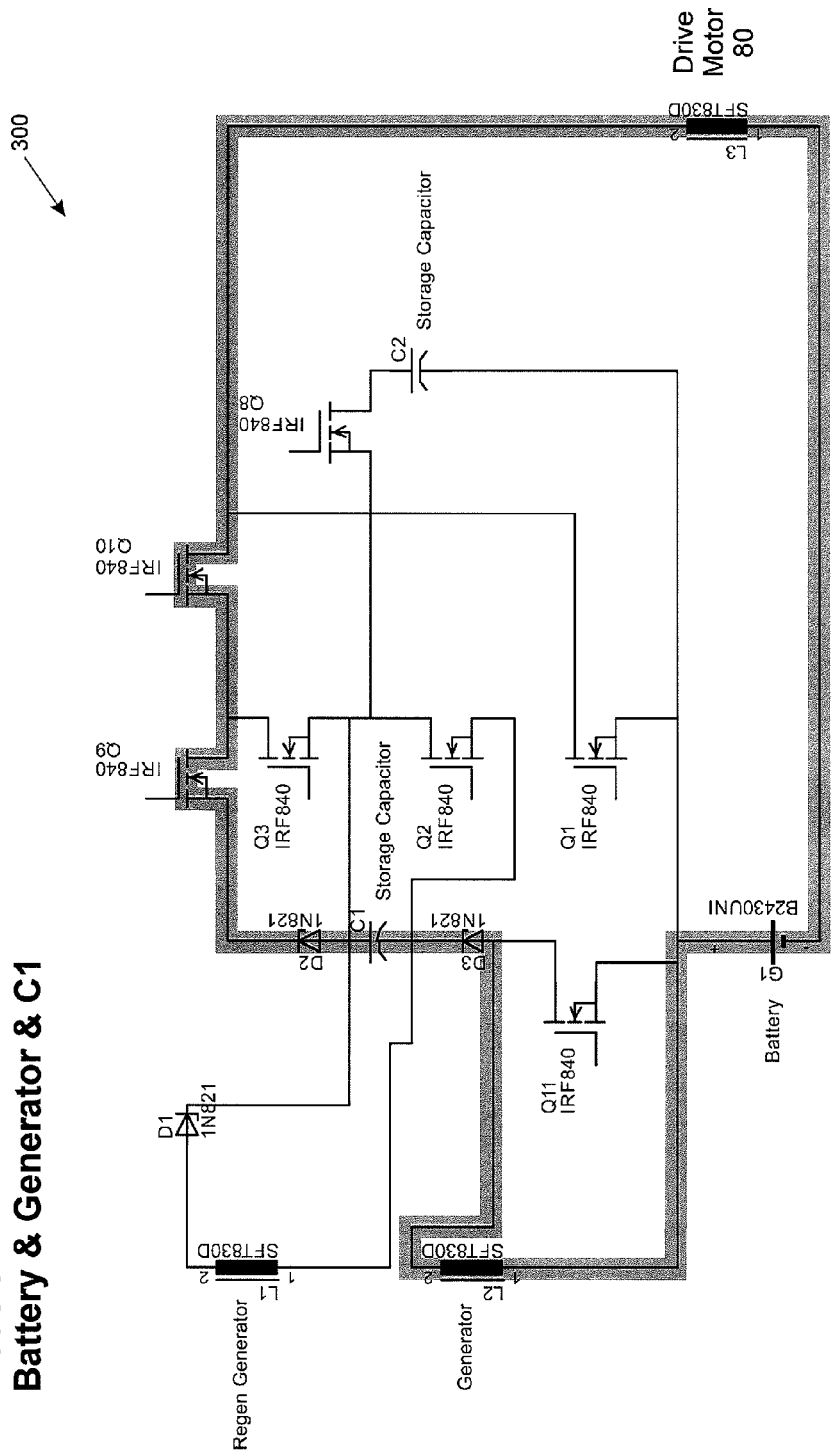

Mode 3 is illustrated in FIG. 16C. In this mode, the battery $G_1$ is serially connected to a capacitor $C_1$ as well as the generator; each producing about 16 horsepower for a total of 48 horsepower, for example, initially in this mode until the capacitor $C_1$ exponentially discharges in which case, the power output will be that produced by the battery $G_1$, namely 16 horsepower+the power produced by the generator. In this mode, the FETs $Q_9$ and $Q_{10}$ are on and the diodes $D_2$ and $D_3$ are conducting. The power losses in this mode are about 500 watts.

Figure 16D:
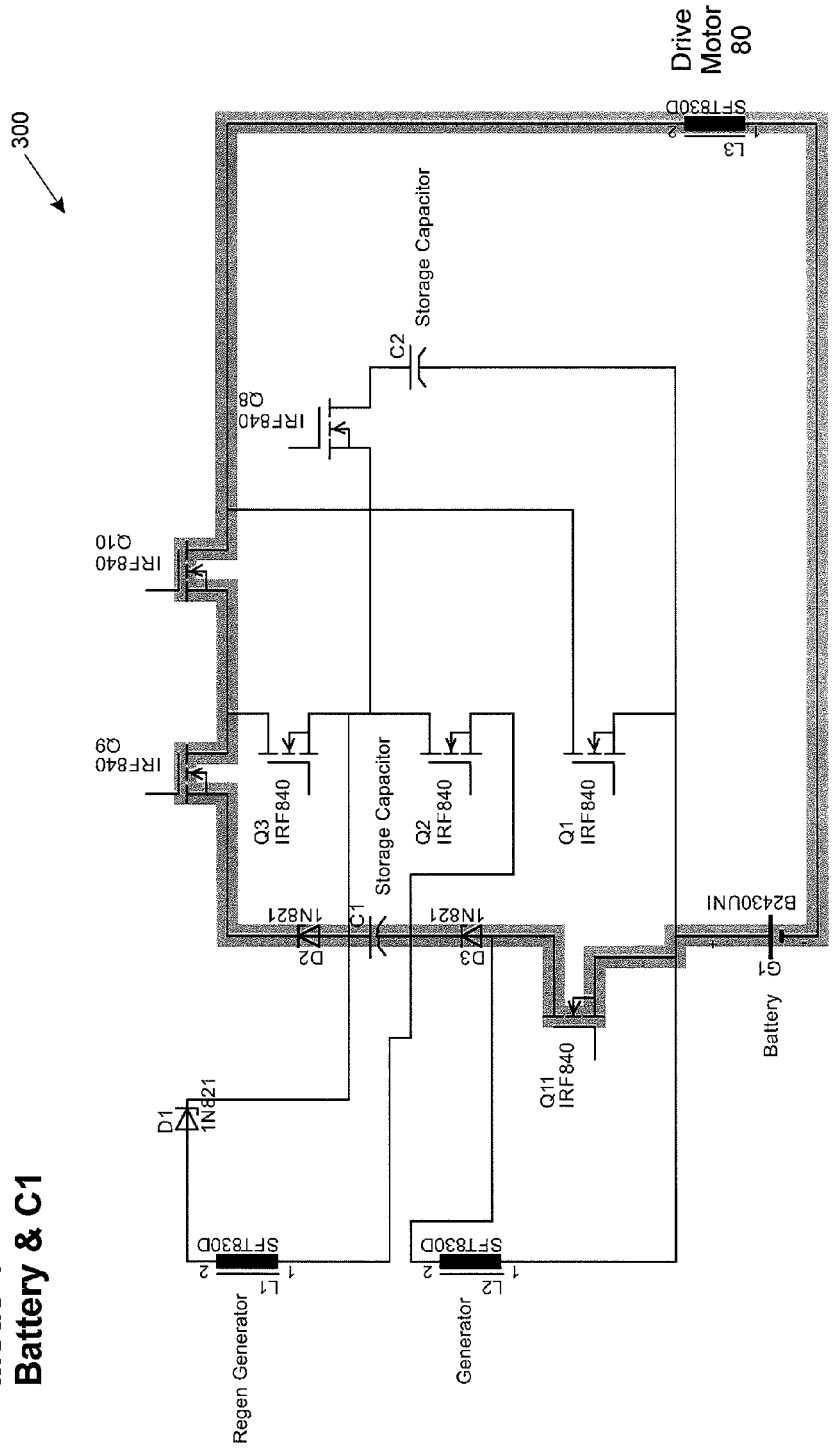

Mode 4 is illustrated in FIG. 16D. In this mode, the battery $G_1$ is serially connected to a capacitor $C_1$ producing, for example, a total of 32 horsepower initially in this mode until the capacitor $C_1$ exponentially discharges in which case, the power output will be that produced by the battery $G_1$, namely 16 horsepower. The FETs $Q_9$, $Q_{10}$ and $Q_{11}$ are on in this mode as are the diodes $D_2$ and $D_3$. The total power losses in this mode are about 700 watts.

Figure 16E:
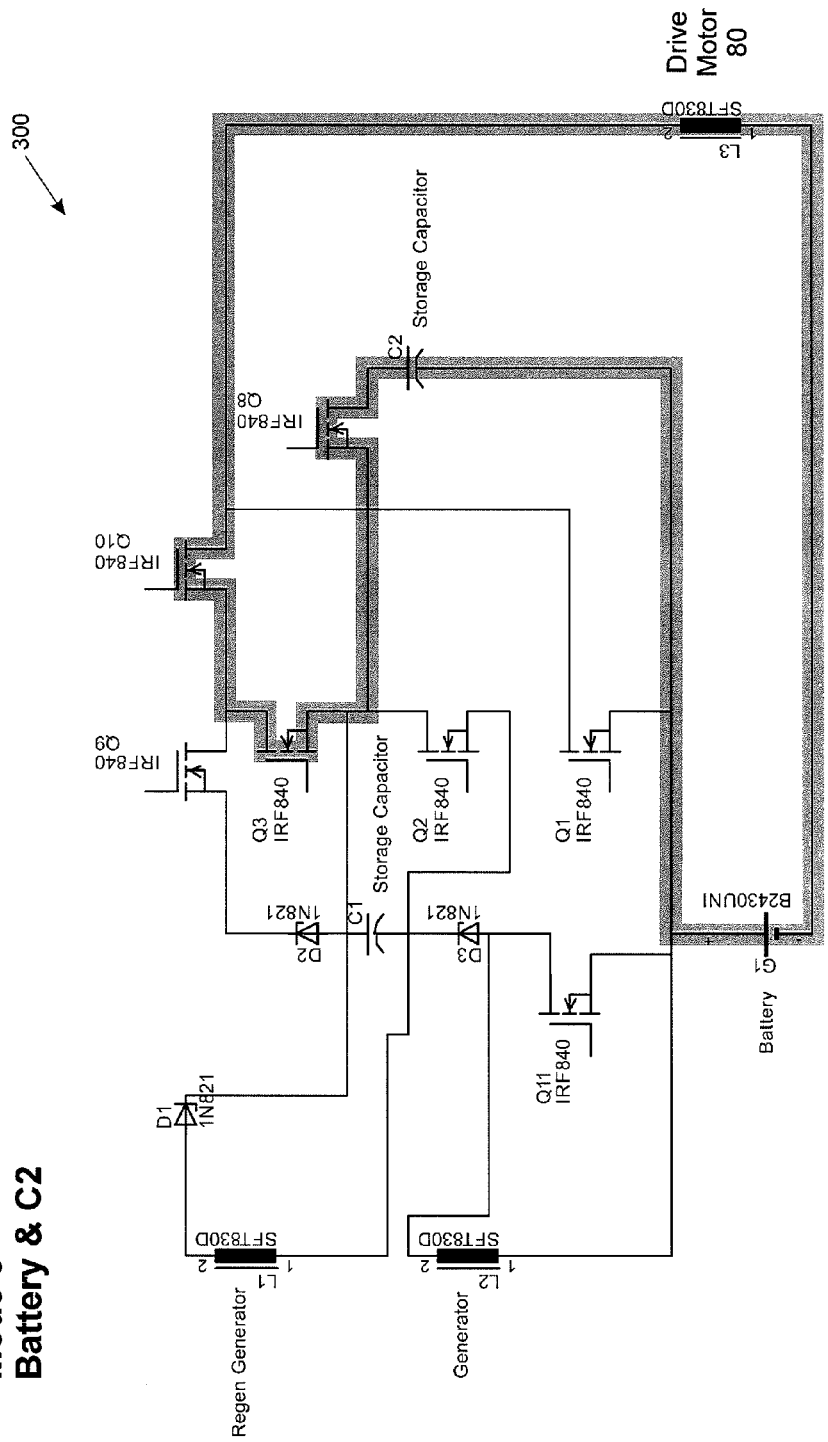

Mode 5 is illustrated in FIG. 16E. In this mode, the FETs $Q_3$, $Q_8$ and $Q_{10}$ are on. As such the battery $G_1$ is serially connected to a capacitor $C_2$ producing, for example, a total of 32 horsepower initially in this mode until the capacitor $C_2$ discharges in which case, the power output will exponentially decrease to the power output produced by the battery $G_1$, namely 16 horsepower. The power losses in this mode are essentially the power losses of the three (3) FETs $Q_3$, $Q_8$ and $Q_{10}$ and are thus about 600 watts.

Figure 16F:
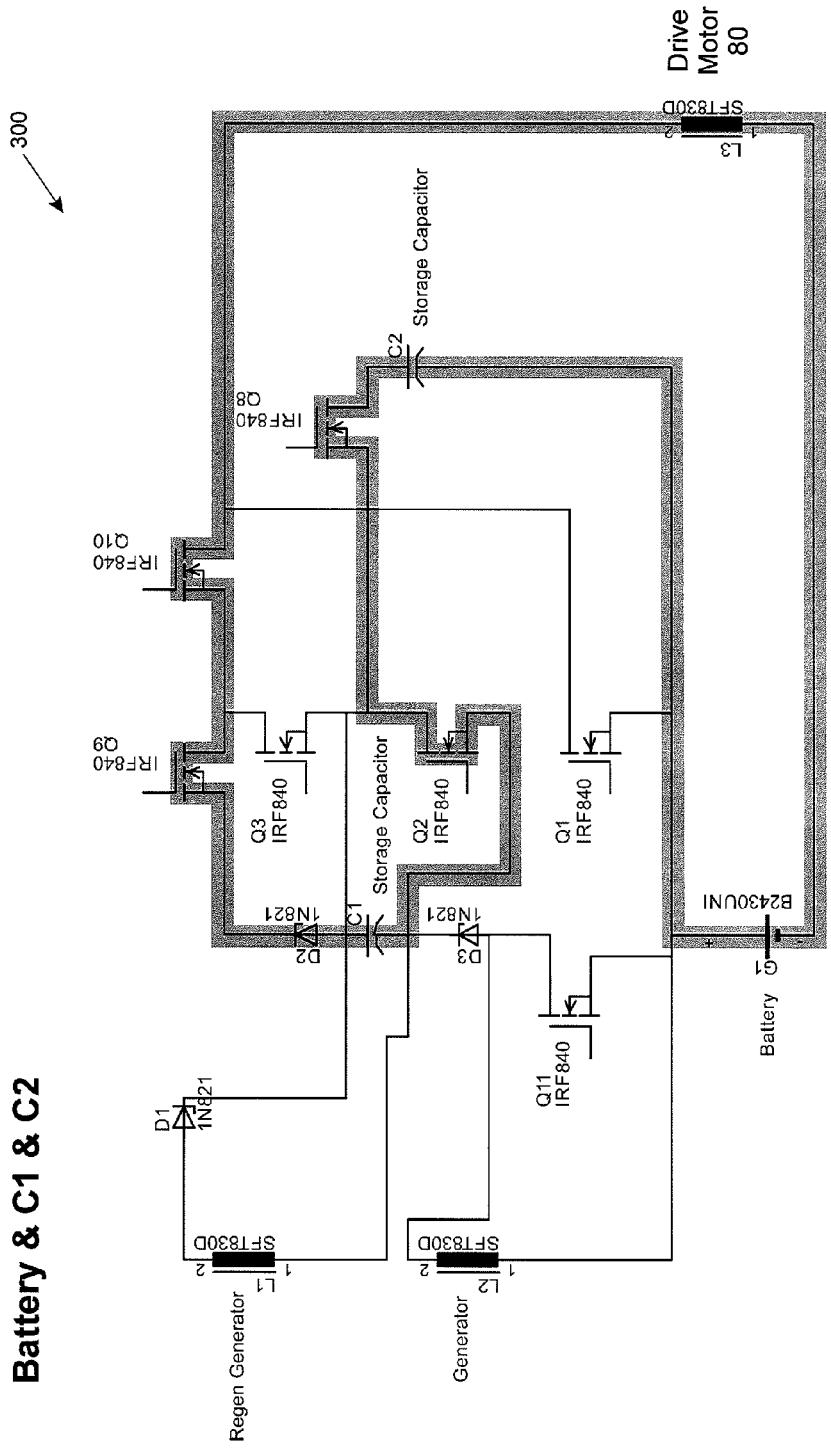

Mode 6 is illustrated in FIG. 16F. In this mode, the battery $G_1$ is serially connected to the capacitors $C_1$ and $C_2$ providing 48 horsepower initially and exponentially decreasing down to 16 horsepower as the capacitors $C_1$ and $C_2$ discharge. In this mode the FETs $Q_2$, $Q_8$, $Q_9$ and $Q_{10}$ are on and the diode $D_2$ is conducting for a total power loss of about 850 watts.

Adaptive Power Control Circuit

Software Flow Diagram

The software flow diagram for the adaptive power control circuit 300 is illustrated in FIG. 17. Initially, in step 302, the system checks to see if the power system 20 is being charged by an external AC source by way of an AC connection 150 (FIG. 1) If so, the system charges the batteries 82, 84 and 86 in the electric motor battery bank and the accessory battery 76 in step 304. These batteries 82, 84, 86 and 76 are charged to their full charging potential. Once the batteries 82, 84, 86 and 76 are fully charged, as determined by step 306, the system charges the capacitor bank 78 and specifically the capacitors $C_1$ and $C_2$ (FIG. 16) in step 308. Once the capacitors $C_1$ and $C_2$ are fully charged, as determined in step 310, the system may optionally maintain a trickle charge on the batteries 82, 84, 86 and 76.

Turning to FIG. 17, initially, the vehicle is started in place. During this condition, there is no acceleration. As such, the system initially starts up in Mode 1. The system checks in step 302 to make sure that the power system 20 is no longer plugged into an external AC source. If the vehicle power system 20 has been disconnected from the external AC source, the system checks whether a request has been made for acceleration, for example, by monitoring the position of the throttle linkage, as generally known in the art. If the system determines that a request for acceleration has been made, the system checks in step 314 whether the battery 82, 84 or 86 (FIG. 1) is greater than a predetermined minimum voltage. If not, the generator 72 is started in step 316 and charges the battery 82, 84 or 86 until the battery voltage exceeds the predetermined minimum voltage in step 318. Based upon a continued acceleration request, at this point, the adaptive power control circuit 300 switches to Mode 2, as indicated by the logic block 320. As mentioned above, the battery $G_1$ and the generator 72 (FIG. 1) are connected in series, thereby providing an increased drive voltage to the drive motor 80. If there is additional demand for acceleration, the system checks in step 322 if the capacitor $C_1$ is fully charged. If so, the adaptive power control circuit 300 switches to Mode 3, as indicated by the logic block 324, in which the battery $G_1$, generator 72 and the charged capacitor $C_1$ are all connected in series to provide power to the drive motor 80. As the capacitor $C_1$ discharges, the adaptive power control circuit 300 reverts back to Mode 2, assuming a continuous Mode 3 demand exists.

If the acceleration request ceases, the system checks the battery voltage in step 314, as discussed above. If the battery voltages exceeds a predetermined minimum voltage, the system adaptive power control circuit 300 enters Mode 1 in which only the battery $G_1$ is connected to the drive motor 80 (FIG. 1), as indicated by the logic block 326.

If there is an acceleration demand equivalent to Mode 4, the system checks in step 328 whether the capacitor $C_1$ is fully charged. If so, the system enters Mode 4 in which the battery $G_1$ is serially connected to the capacitor $C_1$. If there is an acceleration demand equivalent and the system determines in step 334 that the capacitor $C_1$ is not fully charged, the system checks in step 332 whether the capacitor $C_2$ is fully charged. If so, the system enters Mode 5 in which the battery $G_1$ is serially connected to the capacitor $C_2$, as indicated by the logic block 336.

Figure 16G:
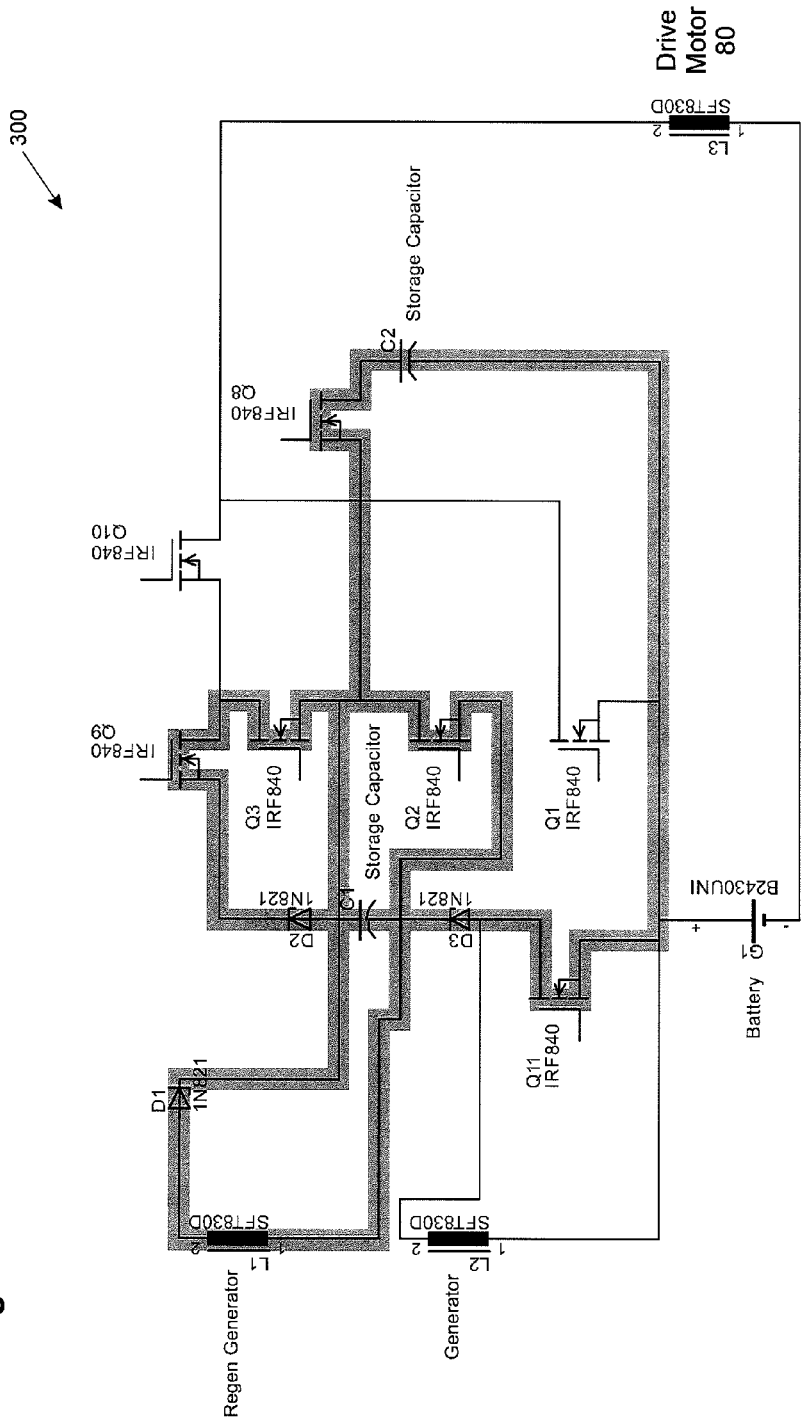

Mode 6 represents the state in which both capacitors $C_1$ and $C_2$ are connected to the battery $G_1$. If both capacitors $C_1$ and $C_2$ are fully charged, as indicated by the logic blocks 335 and 338, respectively, the adaptive power control circuit 300 enters Mode 6 and supplies the maximum voltage to the drive motor 80 until the capacitors $C_1$ and $C_2$ discharge, in which case, the system drops down to modes with less voltage, such as Modes 4 or 5 and eventually to Mode 1, should the acceleration demand persist The system has an inherent regeneration mode when the vehicle is experiencing braking, as indicated by the logic block 340. In that mode, the drive motor 80 acts as a DC generator and generates DC current. This current may be used to charge the capacitors $C_1$ and $C_2$, as illustrated in FIG. 16 and identified as a Regen Generator. If the capacitors $C_1$ and $C_2$ are fully charged any excess current can be used to charge the batteries. The capacitors $C_1$ and $C_2$ are loads and provide electronic braking in this mode, If additional braking is required, as determined step 342, mechanical brakes are activated in step 344. The Regen Mode is illustrated in FIG. 16G. In this mode, the FETs $Q_2$, $Q_3$, $Q_8$, $Q_9$ and $Q_{11}$ are on and the diodes $D_1$, $D_2$ and $D_3$ are conducting.

Capacitor Calculations

It is assumed that 500,000 joules of energy are required to stop the vehicle at 60 miles per hour or accelerate the vehicle to 60 miles per hour. As mentioned above, the capacitor bank needs to be sized to provide at least ⅓ of the total energy. Thus, designing the capacitor bank to provide, for example, 250,000 joules, more than adequately meets the requirement. The energy stored in a capacitor is provided by the equation below.

$$E = \tfrac{1}{2} CV^2$$

Plugging known values and assuming each energy source provides about 200 volts, the equation yields a capacitor bank of 12.5 farads ($250{,}000 = \tfrac{1}{2} C\, 200^2$). A suitable capacitor is a Panasonic Model No. ECE-P2DA56HA, 200 volt 5600μ farad electrolytic capacitor. It is known that capacitors in parallel add like resistors in series. Therefore 2232-5600μ farad capacitors connected in parallel are required to provide 12.5 farads. Each 5600μ farad capacitor is 2×2×3.7 inches or 14.8 inches$^3$. Therefore 2232 capacitors would occupy 2232× 14.8=33033 inches$^3$ or 33033 inches$^3$/(12 inches/foot)$^3$ or 19.2 feet$^3$ or less than a cubic yard. The density of such capacitors is 33033 cubic inches×0.05 lbs. per cubic inch or 1651 lbs.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is.

We claim:

1. A power system for adaptively supplying power and dynamically controlling power for operation of a vehicle subject to highway and city driving conditions wherein the driving conditions include variable loads due to a combination of grades and operator demands for acceleration comprising:
   at least one electric motor operatively coupled to the vehicle to provide motive force;
   a battery bank which includes a plurality of batteries configured to be coupled and provide power to said at least one electric motor, the power is stored and released by said battery bank by transfer of electrochemical energy;
   a capacitor bank for storing electric charge for release on demand to deliver power;
   a circuit for measuring the state of charge of each of said plurality of batteries in said battery bank that is coupled to said one or more electric motors and for measuring the amount of stored electric charge in said capacitor bank, said circuit having means for measuring the amount of discharge during operation of the vehicle of said each of said plurality of coupled batteries and said capacitor bank and generating a charge signal proportional to said amount of discharge measurement;
   a controller coupled to said circuit for measuring the state of charge and responsive to said charge signal for adapting power supplied to said electric motors to said driving conditions and for dynamically controlling power to operate said vehicle; and
   said controller having an adaptive control system for selectively supplying power to said at least one electric motor by operatively connecting said capacitor bank in series with at least one of said batteries during predetermined conditions requiring increases of charge in response to operator demands and road conditions producing increased load for transferring charge from said capacitor bank; and a dynamic control system for connecting one or more of said plurality of batteries to said at least one electric motor forming a circuit, said controller disconnecting said one or more of said plurality of batteries from said at least one electric motor and connecting a different one of said plurality of batteries to said at least one electric motor as a function of the amount of discharge of said one or more of said plurality of batteries connected to the electric motor, wherein said dynamic control system is capable of changing said circuit formed to selectively maintain charge levels in said battery and said capacitor sufficient for said adaptive control system to operatively supply power.

2. The power system as recited in claim 1, further including a system for directly monitoring the discharge rate of the battery connected to said one or more electric motors during predetermined operating conditions which included a condition when said battery discharge rate is not constant and said controller is configured to connect said capacitor bank to said one or more electric motors during said condition or alternatively charge one or more of said plurality of batteries.

3. The power system as recited in claim 1, further including a pneumatic subsystem which includes a least one air tank, an air motor and an electric generator for supplying electric current in order to charge said batteries.

4. The power system as recited in claim 1, wherein the battery coupled to the drive motor is defined as a coupled battery and said circuit further includes:
   at least one switch for selectively disconnecting said coupled battery from said circuit in order to enable the open circuit voltage of said coupled battery to be measured;
   a charging circuit operative to individually charge batteries in said plurality of batteries; and
   a circuit for measuring the amount of discharge of said coupled battery and individually charging said coupled battery as a function of said open circuit voltage and a predetermined amount of said discharge.

5. The power system as recited in claim 1, wherein said circuit for measuring the discharge of said coupled battery while connected to said electric motor includes a plurality of switches for disconnecting the coupled battery connected to said electric motor and connecting another one of said plurality of batteries to said electric motor as a function of the amount of discharge of said coupled battery connected to said electric motor.

6. The power system as recited in claim 4, further including circuits for charging said batteries under predetermined conditions from said capacitor bank.

* * * * *